(12) United States Patent
Tougas et al.

(10) Patent No.: US 12,346,421 B1
(45) Date of Patent: Jul. 1, 2025

(54) TATTOO DETECTION-BASED VIDEO AUTHENTICATION METHOD AND SYSTEM

(71) Applicant: UIPCO, LLC, San Antonio, TX (US)

(72) Inventors: Brian Tougas, Spring Branch, TX (US); William Daniel Farmer, Carrollton, TX (US); Ruthie D. Lyle, Durham, NC (US); Kelly Q. Baker, San Antonio, TX (US); Ryan Thomas Russell, Auburn, WA (US); Noe Alberto Martinez, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 303 days.

(21) Appl. No.: 18/050,214

(22) Filed: Oct. 27, 2022

Related U.S. Application Data

(60) Provisional application No. 63/273,494, filed on Oct. 29, 2021.

(51) Int. Cl.
 *G06F 21/32* (2013.01)
 *G06V 10/74* (2022.01)
 *G06V 40/10* (2022.01)

(52) U.S. Cl.
 CPC .............. *G06F 21/32* (2013.01); *G06V 10/74* (2022.01); *G06V 40/10* (2022.01)

(58) Field of Classification Search
 None
 See application file for complete search history.

(56) References Cited

U.S. PATENT DOCUMENTS

| | | | | |
|---|---|---|---|---|
| 5,878,155 | A | * | 3/1999 | Heeter ............. G07C 9/37 382/115 |
| 2014/0119617 | A1 | * | 5/2014 | Bertin ............. G06F 21/32 382/116 |
| 2018/0300467 | A1 | * | 10/2018 | Kwong .............. G06F 21/32 |
| 2020/0226407 | A1 | * | 7/2020 | Kendrick ........... G06N 20/00 |

(Continued)

FOREIGN PATENT DOCUMENTS

FR 3112408 A1 * 1/2022 ............. G06F 21/31

OTHER PUBLICATIONS

L. M. Dinca and G. P. Hancke, "The Fall of One, the Rise of Many: A Survey on Multi-Biometric Fusion Methods," in IEEE Access, vol. 5, pp. 6247-6289, 2017, doi: 10.1109/ACCESS.2017.2694050. (Year: 2017).*

*Primary Examiner* — Philip J Chea
*Assistant Examiner* — James Ross Hollister
(74) *Attorney, Agent, or Firm* — Plumsea Law Group, LLC

(57) ABSTRACT

A tattoo detection-based method and system of performing an authentication of video of a person in order to authorize access to a secured resource is disclosed. The user provides image data in which they present a region of skin on which a pattern or code has been tattooed with ink that is invisible to the human eye. The system and method are configured to evaluate the image data to determine whether the cloaked token is present. If a cloaked token is present, the system determines the image is authentic and can verify an identity of the person. In some cases, the system can further be configured to automatically grant the person access to one or more services, features, or information for which he or she is authorized.

18 Claims, 11 Drawing Sheets

(56) References Cited

U.S. PATENT DOCUMENTS

| | | | | |
|---|---|---|---|---|
| 2022/0210341 A1* | 6/2022 | Hwang | ................... | H04N 7/15 |
| 2022/0370778 A1* | 11/2022 | Azdoud | ................. | G06F 21/16 |
| 2023/0029053 A1* | 1/2023 | Manuel-Devadoss | ...................... H04L 9/0825 | |

* cited by examiner

TATTOO DETECTION-BASED VIDEO AUTHENTICATION METHOD AND SYSTEM

CROSS-REFERENCE TO RELATED APPLICATION

This application claims the benefit of U.S. Provisional Patent Application Ser. No. 63/273,494 filed on Oct. 29, 2021 and titled "Tattoo Detection-Based Video Authentication Method and System", the disclosure of which is incorporated by reference in its entirety.

TECHNICAL FIELD

The present disclosure generally relates to identity authentication, and specifically to a method and system for authentication of videos of persons seeking access to one or more secured services, features, and resources. The authentication is based on detection of a specific cloaked tattoo pattern associated with a user detected in image data captured by the user's computing device.

BACKGROUND

Organizations may provide authorized end-users with various secured services or resources via multiple communication channels. Examples of such channels include modes of communication (e.g., a communications network) for exchanging data between devices, where such devices may include, but are not limited to, computing devices, such as tablets, personal computers, and smartphones; point of sale devices; ATMs; connected smart devices, such as refrigerators, watches, and laptops; telephones, such as landline telephones or mobile phones; electronically locked spaces managed by computer user interfaces, such as safe deposit box chambers, lockers, cars, offices, homes; and face-to-face contacts, such as interaction between a user and an employee of the organization. Channels may also include software and firmware associated with the devices and communications devices, such as web portals, applications, networks, mobile applications, and instant messaging systems. Channels may also include hardware associated with the computing devices and telephones, such as the network hardware, credit card scanners, and retinal scanners.

In most scenarios in which an end-user attempts to access a secured resource via one or more of these channels, the end-user will be required to provide some proof of identity, typically associated with an identification card, key-card, fingerprint, or other factor before access is granted. Personal computers (computing devices) pose additional complexities in authenticating users. Computing devices are commonly used by more than one person. It is generally not safe to assume that the identity of the computing device satisfies the ownership factor. Additionally, computing devices have been more easily compromised than other devices. Current solutions increase security, but are often inconvenient for users. More recently, the threat of video forgery (e.g., deep fakes) have increased concern that image data of an end-user may not be authentic.

Thus, authentication (i.e., identifying and verifying) of an end-user can be time-consuming for both the end-user and the organization, as well as burdensome for users who are required to carry and present the necessary identification credentials and/or keys, or memorization of passwords or codes. It may be appreciated that many businesses and other organizations would benefit from mechanisms by which to reduce the costs associated with the authentication and authorization of customers. Furthermore, customers will be attracted by an authentication system that reduces or even eliminates the need to carry or remember multiple unique identification factors, as well as a system that significantly improves account security.

There is a need in the art for a system and method that addresses the shortcomings discussed above.

SUMMARY

In one aspect, a method of verifying an authenticity of video in order to protect user resources is disclosed. The method includes a first step of receiving, at a cloud-based authentication system and from a first computing device, a request by a first person to access a secured resource of a first user, and a second step of receiving at a first time, at the authentication system, first image data captured by a camera of the first computing device, the camera being configured to capture light outside the visible spectrum. In addition, the method includes a third step of detecting, at the authentication system, a first cloaked token in the first image data, the first cloaked token being hidden in visible light and are revealed in a particular band of nonvisible light, and a fourth step of determining the first cloaked token is sufficiently similar to a reference pattern so as to be classified as a match. Furthermore, the method includes a fifth step of verifying, in response to the first cloaked token matching the reference pattern, an authenticity of the video, and a sixth step of granting the first person access to the secured resource for which the first user is authorized.

In another aspect, a method of verifying an authenticity of a video in order to protect user resources is disclosed. The method includes a first step of receiving, at a cloud-based authentication system and from a first computing device, a request by a first person to access a secured resource of a first user, and a second step of receiving at a first time, at the authentication system, first image data captured by a camera of the first computing device, the camera being configured to capture light outside the visible spectrum. The method further includes a third step of detecting, at the authentication system, a first cloaked token in the first image data, the first cloaked token being hidden in visible light and are revealed in a particular band of nonvisible light, and a fourth step of processing, at the authentication system, the first cloaked token in order to extract a digital code from the first cloaked token. In addition, the method includes a fifth step of determining, at the authentication system, that the digital code includes first identification data, a sixth step of verifying, in response to the first cloaked token including the first identification data, an authenticity of the video, and a seventh step of granting the first person access to the secured resource for which the first user is authorized.

In another aspect, a system for verifying an authenticity of video in order to protect user resources includes a processor and machine-readable media. The machine-readable media include instructions which, when executed by the processor, cause the processor to receive, at a cloud-based authentication system and from a first computing device, a request by a first person to access a secured resource of a first user, and to receive at a first time, at the authentication system, first image data captured by a camera of the first computing device, the camera being configured to capture light outside the visible spectrum. The instructions also cause the processor to detect, at the authentication system, a first cloaked token in the first image data, the first cloaked token being hidden in visible light and are revealed in a particular band of nonvisible light, and to determine the first cloaked token is sufficiently similar to a reference pattern so as to be classified as a match. In addition, the instructions cause the processor to verify, in response to the first cloaked token matching the reference pattern, an authenticity of the video, and to thereby grant the first person access to the secured resource for which the first user is authorized.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
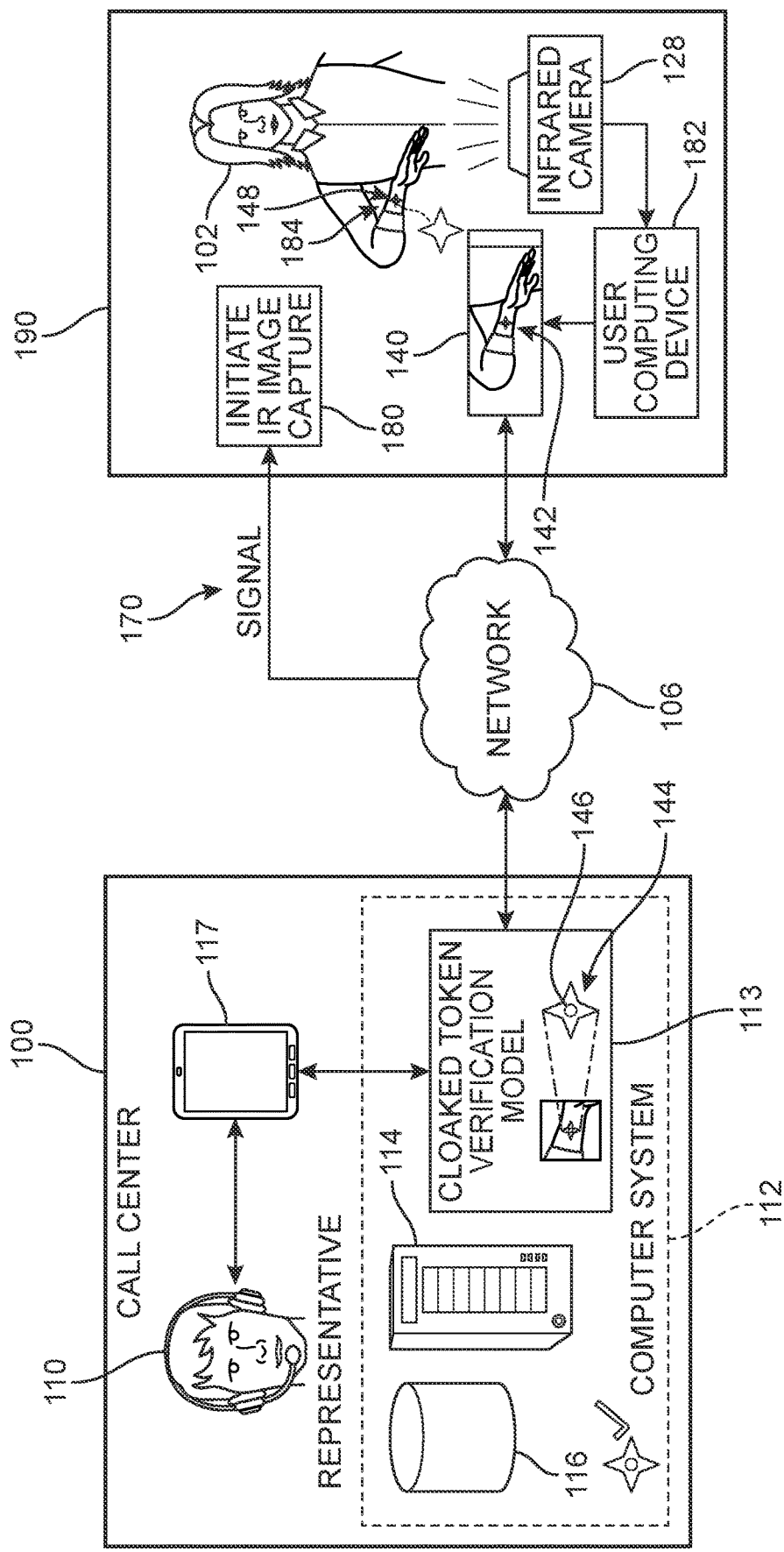
FIG. 1 is an overview of a scenario in which image data of a person that includes a cloaked token is captured during a communication session in order to obtain access to a secured resource, according to an embodiment.

The embodiments provide a method and system of authenticating user videos and other streaming image data in a more secure and more efficient manner by detection of a cloaked (nonvisible) token on the user's skin in the image. The cloaked token can be detected using an infrared or ultraviolet camera. As described in greater detail below, an authentication process and system based on a user's cloaked token may be utilized for reducing and in some cases eliminating the need for users to present credentials, input passwords, or otherwise offer identity tokens or factors, as well as curtail the use of video forgery to fraudulently access secured resources such as a user's private account. The proposed system takes advantage of an increasing reliance on teleconferencing and the growing availability of image sensors with computing devices in the day-to-day life of the modern consumer.

In different embodiments, the system contemplates a method of using tattoos with ink that is either invisible or difficult to observe in normal visible light, but becomes apparent when exposed to non-visible light. As a general matter, the human eye can see from about 400 nm (violet) to about 700 nm (red). The human eye cannot see below 400 nm or above 700 nm. Below 400 nm is the ultraviolet range and above 700 nm is the infrared range. Thus, an identifier that is only apparent in either the infrared (IR) or ultraviolet (UV) spectrum (i.e., invisible light) can allow for a higher level of security with respect to an authentication event. In some embodiments, the proposed systems also include or employ a camera (which may be integrated into a phone) that can capture infrared or ultraviolet light. When a person requests access to a secure resource, such as a bank account, the system can be configured to require the capture of an authenticating image or video using the camera capable of capturing invisible light. In one example, the system could be operated by the entity providing the secure resource to confirm that the invisible portion of the tattoo is visible in the authenticating image.

In some embodiments, the invisible tattoo—also referred to herein as an invisible identification token, covert token, or cloaked token (or simply "token")—may be marked in invisible (e.g., UV or IR) ink. The token may be overlaid by a visible tattoo in some cases. For example, a token may be printed in infrared ink while a human-readable marking is overlaid on the token in visible ink. A human eye would not normally be able to see the infrared or ultraviolet ink, but instead would only see the visible tattoo. In some embodiments, the cloaked ink can be selected from one or more of glow-in-the-dark, ultraviolet, infrared, photo-chromatic, hydro-chromatic, and thermo-chromatic ink. In other words, the token would be normally invisible, hidden, or highly obscured, until exposed to a particular light or element or temperature.

More specifically, the system contemplates the capture of video or images during communication sessions with a user. This can occur, for example, during a video session with a customer representative. Image data of the user's face or other part of the body on which the token is tattooed is recorded, stored, and used as training data for future authentication sessions. In another example, the token itself includes a pattern or code that can be scanned by the system, and so training/enrollment data would not be necessary. In some cases, the representative may manually initiate the recording of the data from the user's device. In other cases, the system could be configured to monitor the position and orientation of the user's face (or arm, hand, etc.) in the video feed. When the user's face is in an appropriate position and orientation, the system could send a signal to have image data captured for use by the system, either as enrollment data or for detection of the expected token. The token could then be detected by the authentication system to indicate that this is not a faked video.

In different embodiments, the features provided by such a system can be advantageous in combating the growing threat of video forgery. Deep fake algorithms in particular are becoming increasingly sophisticated. By generating a face through a deep learning neural network, such algorithms are able to replace a real face with an imposter fake face in real time. Such algorithms can be implemented using both Artificial Intelligence (AI) and Machine Learning (ML) to 'trick' a secured system into releasing confidential information. While existing technologies allow digital watermarks to be added to images, videos, and audio files or streams to ensure the authenticity of distributed media, the use of such technologies is typically controlled by producers of the media rather than by a speaker within a video. As will be discussed below, the proposed systems can further be configured to verify a user's identity with minimal user effort and offer a simplified, efficient, and ultimately highly convenient process by which to authorize and grant the user access to secured resources. Such systems can rely on device infrastructure that is already in place for video and image recording, making it simple to deploy at a low cost.

References to various aspects of access management will be discussed throughout the following disclosure, including identification, authentication, and authorization. For purposes of this application, the term 'identification' refers to the process of associating a user with something that has occurred on a server, on a network, or with some other resource, and typically occurs when a user (or any subject) claims or professes an identity. Traditionally, the process of identification can be accomplished with a username, a process ID, a smart card, or anything else that can uniquely identify a subject. In addition, the term authentication refers to the process of proving (or verifying) an identity or source of identity, and typically occurs when subjects provide appropriate credentials to prove their identity. For example, when a user provides the correct password with a username, the password proves that the user is the owner of the username. Thus, the authentication provides proof of a claimed identity. In the embodiments described herein, authentication of an image based on the detection of a specific output in the image can be used to prove the user is the owner of the username. As a general matter, three main methods of authentication include (a) user knowledge, such as a password or PIN; (b) user possession, typically provided by the secured system, such as a key, smart card, CAC (Common Access Card), PIV card (Personal Identity Verification card), RSA, or other card or token, magnetic stripe cards, certificates with a digital signature, computing device that is configured to receive a control signal, etc.; and (c) biometric factors, such as voice recognition, facial recognition, retinal and fingerprint scans, etc. It should be appreciated that the proposed embodiments may be used as a layer of security in addition to conventional methods such as the three categories described above (e.g., in addition to passwords, pins, ID card, biometric factors, etc.).

Authorization refers to the concept of allowing access to resources only to those permitted to use them. In other words, authorization is a process that protects resources by only allowing access by consumers that have been granted authority to use or receive them. Some examples of such resources include individual files' or items' data, computer programs, computer devices and functionality provided by computer applications, as well as more tangible resources such as ATMs, banks, vaults, offices, or other spaces with specific security requirements. In addition, the use of the term "secured resources" refers to services, features, or other resources (physical and digital or virtual) that are access-restricted and are designed to be made available only to users that have been authenticated and authorized for such access. The term "passive" refers to the concept of a system and method that is not dependent on any particular 'active' interaction of a person with a device resulting from a change in the person's normal activity or behavior and/or do not require the user to remember anything. In other words, walking and moving their body from one location to another, as well as more fine motor movements (e.g., adjusting the position of their arm or a change in facial expression) are passive interactions, as the person could perform these activities regardless of the authentication system that is in place. However, other user actions, such as but not limited to providing a passcode, pre-registered security question answers, etc. are active inputs and a system requiring any of these types of information would not be considered passive. In addition, this type of arrangement-relying on a change in expression of the user or indicating which speaker produced a sound-precludes the need to previously record and store any biometric data (e.g., retinal scan, fingerprint scan, voiceprint, etc.) for the user, which some users are uncomfortable doing.

Organizations and businesses often provide support to customers by making available to their customers one or more member service representatives (MSRs) or other customer representatives and service agents (referred to generally herein as "agents") who have access to networked computers, telephones, often networked to a larger corporate computer network, including mainframes, microcomputers and LANs. For example, voice and data pathways into the center can be linked through routing servers and computer telephony integration (CTI). In some cases, CTI also facilitates interfaces with customer support servers in addition to any e-mail system, databases and web-based services. A customer may contact or be contacted by an MSR to learn more about a service or product, obtain guidance, or purchase various items. Implementations of the proposed systems and methods may also include interactions with an agent, virtual or human, of a secured system. This service representative or agent is stationed at a location that is remote relative to the customer's location, such as a call center. As used herein, the term "customer" or "user" should be understood to refer to any end-user or person requesting or receiving assistance or other communications from a secured system, including via a communication session with a remote agent, whether human or virtual/artificial. The customer can typically view at least one aspect of the interaction through a display of their computing device.

It may be appreciated that conventional methods of authentication rely heavily on identification documents or other tangible items provided by the system administrators that users are required to carry on their person and present when prompted, and/or intangible factors such as memorized passcodes or security questions and answers. However, such tokens have significant shortcomings. For example, they can be lost, stolen, or forged. In many cases, an individual may need to carry multiple identification cards or tokens, which may be unwieldy. Furthermore, less tangible factors can be burdensome, requiring memorization or physical contact or a particular physical position or proximity with a device. The following systems describe a process of authentication that does not rely on such factors, and serves as a reliable barrier to deep fake imposter attacks. In other words, deep fakes-being dependent on images previously captured of the target accountholder taken by 'normal' visible light cameras—may appear to show the correct user's face, but would not include the cloaked token. The absence of the token would alert the system to the threat of forgery.

In FIG. 1, an example of an authentication process is shown in which a first user 102, in a first location 190, is on a call with a representative 110 who is at a call center 100, or otherwise in a remote location relative to the first user 102. The first user 102 is conversing with representative 110 in order to be authenticated and then obtain access to their account or other secured resource. In different embodiments, first user 102 can participate in the communication session via a telephone or a computing device configured with a network connection and connected to a camera or other image sensor, depending on the mechanism utilized for data transmission.

In some embodiments, first user 102 may have access to a user computing device ("user device") 182 through which the communication session occurs. The device can include a tablet, a laptop, a smartphone, a desktop computer, a smart device, or similar kind of device that allows user 102 to contact call center 100. For purposes of this example, the first customer 102 has just been connected to representative 110 and is seeking access to their account details via a laptop device that is connected to or includes an IR-enabled camera 128.

In different embodiments, the user device 182 can include an electronics unit comprising a plurality of different components, such as one or more of various user interface components (e.g., a touchscreen display, keyboard, mouse, microphone, camera, speaker, etc.), a user interface module, a processor, and/or a communication module. These devices may include a system including one or more processors and memory. Memory may comprise a non-transitory computer readable medium. Instructions stored within memory may be executed by the one or more processors. The user device 182 may be configured to receive and analyze data from various input sensors associated the device or data that is communicated from external components or devices to the device. In some cases, the user device 182 may also include a navigation system equipped with a GPS receiver that can receive GPS information or other receivers capable of receiving global or local positioning information. In addition, in different embodiments, the user device 182 can include one or more types of a device, module, machine, or subsystem whose purpose is to detect features that are invisible in visible light conditions, as will be discussed below.

A communication module may allow the user device 182 to communicate wirelessly. In this case, the communication module is illustrated as a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In different embodiments, the user device 182 may include a device display that can, for example, present information and various media for a product/service support software application ("app"). In some embodiments, the app is associated with the provider of the product/service for which the service representative is offering support. In some embodiments, the first user 102 can receive and send information through a user interface that may be presented on a display for the device. In some embodiments, the display may be a touchscreen, allowing the customer to interact with the user interface directly by touch. The user interface may refer to an operating system user interface or the interface of one or more software applications that may run on the user device 182. In some embodiments, the user interface can include a messaging window or other chat-space by which the service representative may send messages or other digital content. Alternatively, in some embodiments, the first user 102 can also speak with the service representative via a voice calling application on user device 182, or directly through a telephone or other external device.

In an example embodiment, customer service call center 100 includes at least one computer system 114. The term "computer system" refers to the computing resources of a single computer, the partial computing resources of a single computer, a plurality of computers communicating with one another, or a network of remote servers. In one embodiment, computer system 114 includes at least one server having at least one processor.

In different embodiments, computer system 114 includes one or more computing devices (for example, a server) that may be in communication with one or more databases 116. Databases could be co-located with computing devices or could be remote databases that are accessible by computing devices over a network. Databases can include any kind of storage devices, including but not limited magnetic, optical, magneto-optical, and/or memory, including volatile memory and non-volatile memory. In an example embodiment, computer system 114 may also include or be configured with access to an access management platform (see FIGS. 2A and 2B), of which a cloaked token verification module ("verification module") 113 is a component. In some embodiments, the verification module may be implemented in software, hardware, or a combination thereof.

In different embodiments, while the first user 102 is communicating with representative 110, the access management system can be configured to verify an identify of a person so as to either permit or deny access to the user-identity dependent services. As used herein, the term "user" or "member" or "account holder" should be understood to refer to any end-user or person requesting or receiving assistance or other communications from a support agent or service representative. It should be understood that while the following description presents a sequence illustrating the use of the proposed systems and methods in a customer-agent dynamic, in other embodiments, the proposed systems may be utilized by a broad range of end-users, including other types of work calls and corporate calls, or other instances in which access is dependent on video interaction or a detection of video forgery is needed.

In some embodiments, representative 110 may have access to a device of computer system 112 or a device connected to computer system 114. In one embodiment, representative 110 may have access to a representative device 117. In FIG. 1, representative device 117 is depicted as a mobile computing device, such as a smartphone or tablet computer. In other embodiments, representative device 117 could be a desktop computer, a laptop computer or any other kind of computing device. Using representative device 117, representative 110 may be able to review customer records, view images, send documents and forms to a customer, provide access to a secured resource, and/or perform other tasks required to help a customer calling in to call center 100.

In some embodiments, both representative device 117 and user device 182 may be computer systems for processing and communicating information. Each device may generally include a processor, a data storage component, and a display. Each device may also include components to facilitate communication with external systems (for example, hardware and software components to enable communication over a network). In some cases, a device may include one or more input devices, such as a keyboard, mouse, and/or one or more physical buttons integrated into a case of the device. In other cases, a device may further include touchscreen controls and inputs.

In one embodiment, user device 182 could operate in a client-server relationship with one or more servers of computer system 112. For example, computer system 112 may include a server 114 that communicates with user device 182, as well as other remote devices (e.g., user devices of other customers) over a network 106. The user device 182 may provide the front-end of a system that provides users with options for performing various kinds of tasks (for example, making fund transfers when the company is a bank). In some cases, user device 182 may run client software through a web browser, in which case the client software may be hosted on server 114 associated with computer system 112. In other cases, user device 182 may run client software in the form of a native software application that has been downloaded through a centralized marketplace (i.e., an "app store"). In some cases, while the client software that allows users to perform various tasks may be run on user device 182, the data may be retrieved from and stored on databases associated with computer system 112 (e.g., databases 116).

During the call between representative 110 and first user 102, the first user 130 requests access to an account or other secured resource of the first user. In response, in different embodiments, the remote access management system can automatically, or at the manual request of the service representative, initiate an authentication procedure, action, or task that includes a remote image capture event. As a general matter, a remote image capture event refers to the process and period during which the authentication system issues a control signal to a remote user camera device over a network, and the control signal causes the camera to capture an image.

In different embodiments, the access management system, through verification module 113, can generate one or more signals 170 that are transmitted over network 106. The signals 170 can, for example, include a camera control signal 180, as well as a request to the user device 182 to capture the image or otherwise process the image with reference to a specific invisible lighting condition. The signals 170 are received by the user device 182 and cause the camera 128 to capture image data 140. In this example, the first user 102 is raising their arm toward the camera 128 in an orientation that presents a visible tattoo 148 on their wrist 184 to the lens. The image data 140 can be seen to include a digital representation 142 of the visible tattoo 148. In addition, in some embodiments, the camera 128 captures cloaked data. When the image data 140 is received by verification module 113, the verification module 113 extracts the target region and detects the presence of a cloaked token 146. The visible tattoo 148 provides an overlayer 144 of the cloaked token 146. Thus, the visible tattoo 148 may be present in authentic and forged videos like, only an authentic video would also include the cloaked token 146 that is 'hidden' in the visible tattoo 148.

Based on the received image data 140, the system will determine whether to authenticate the user for access to the secured resource. For example, the verification module 113 can process and analyze image data 140 and determine whether the image data 140 includes the pre-stored cloaked token, or a cloaked token that itself contains identifying data, such as a barcode. The barcode can for example comprise 1D (one dimensional) or 2D (two dimensional) barcodes, including but not limited to Code 128, QR code, Data Matrix, PDF417, MaxiCode, Aztec Code, and other data matrix codes. If the expected pattern is detected in the image data 140, the authenticity of the video or image can be verified, providing an additional layer of veracity to the user's identity. In this example, image data 140 does include the cloaked token 146, and the system automatically communicates this information to the service representative. Thus, in FIG. 1, without further action or presentation of credentials by first user 102, the communication session can proceed with permitting first user 102 access to the account linked to the authenticated identity of the first user 102. The first user 102 is then able to make account requests and/or receive sensitive account information.

While in some embodiments the system may incorporate additional layers of authentication that may supplement the authentication process, such as facial recognition, voice recognition, fingerprint recognition, password or pin-code verification, or other such factors, it may be appreciated that the system can be readily implemented without such additional steps. In other words, the first user 102 is able to obtain access to the desired secured resources without an identification card, debit card, or other system-provided token typically presented for such occasions. The system thereby allows the user to be passively (i.e., 'touchlessly') authenticated. In some embodiments, the system is further configured to automatically provide the user with access to the secured service linked to the user's unique account, in response to the authentication that is performed based only or primarily on the sensor capture of the haptic pattern.

Figure 2A:
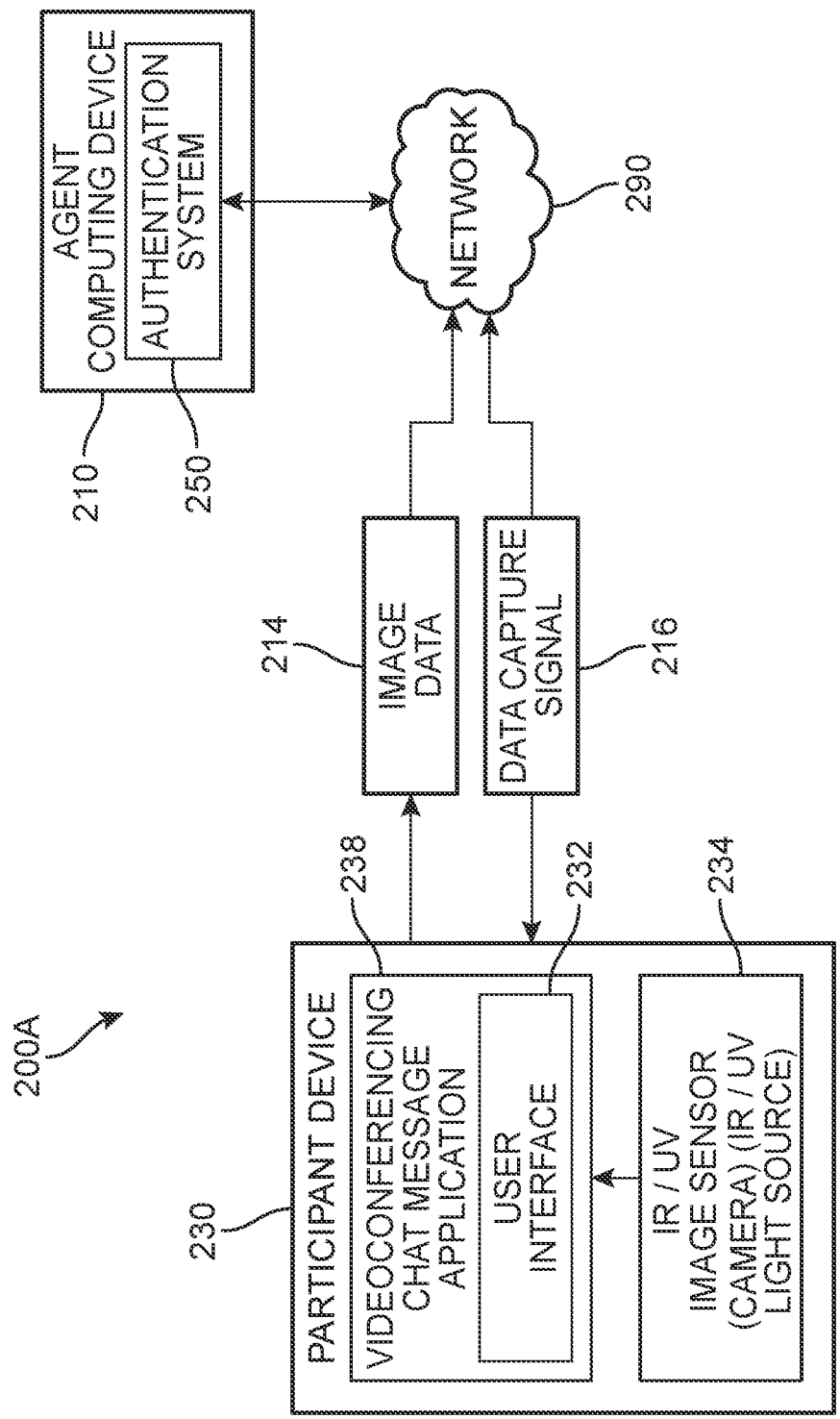
FIGS. 2A-2C are an overview of an environment of a cloaked token detection-based access system, according to an embodiment.
Figure 2B:
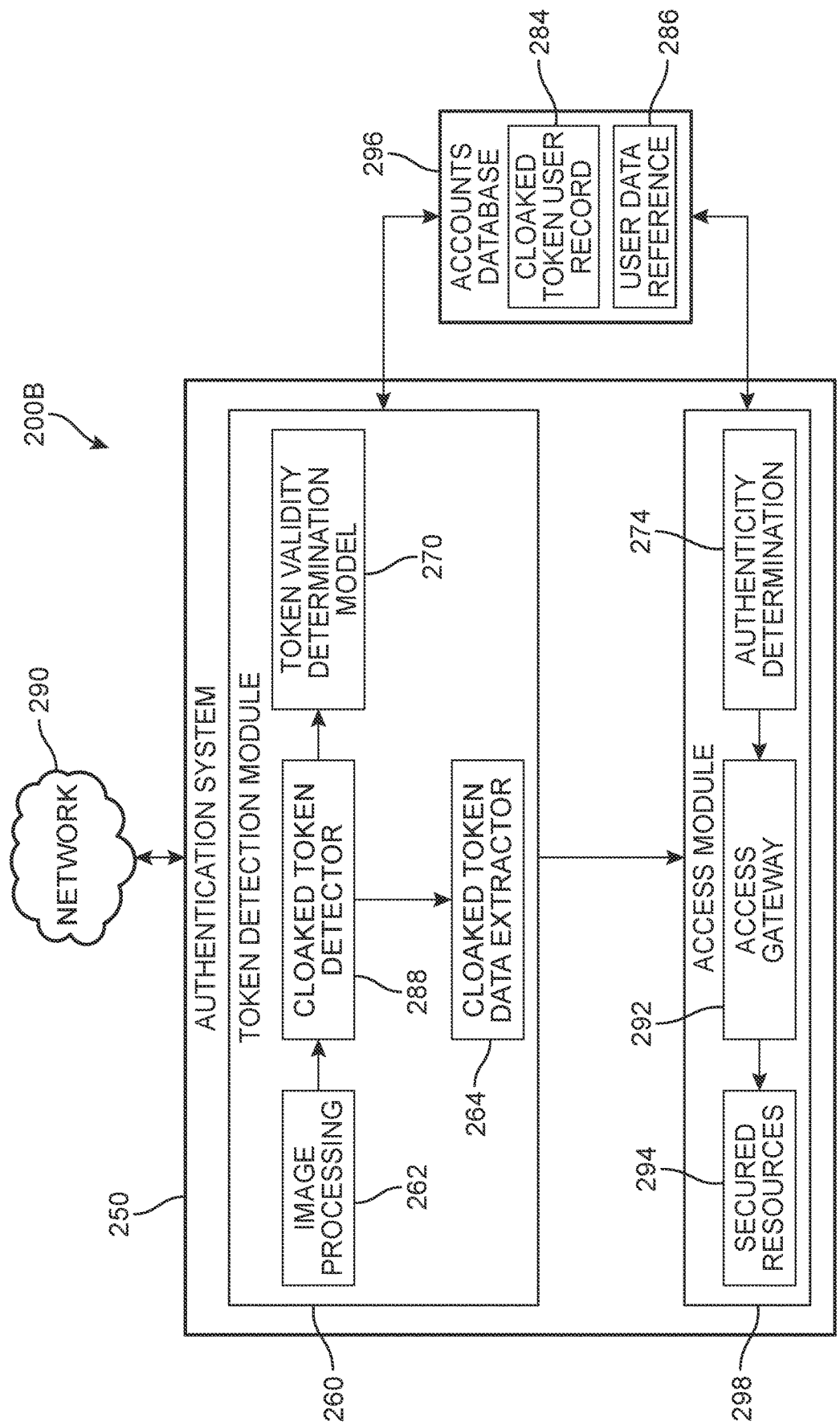
Figure 2C:
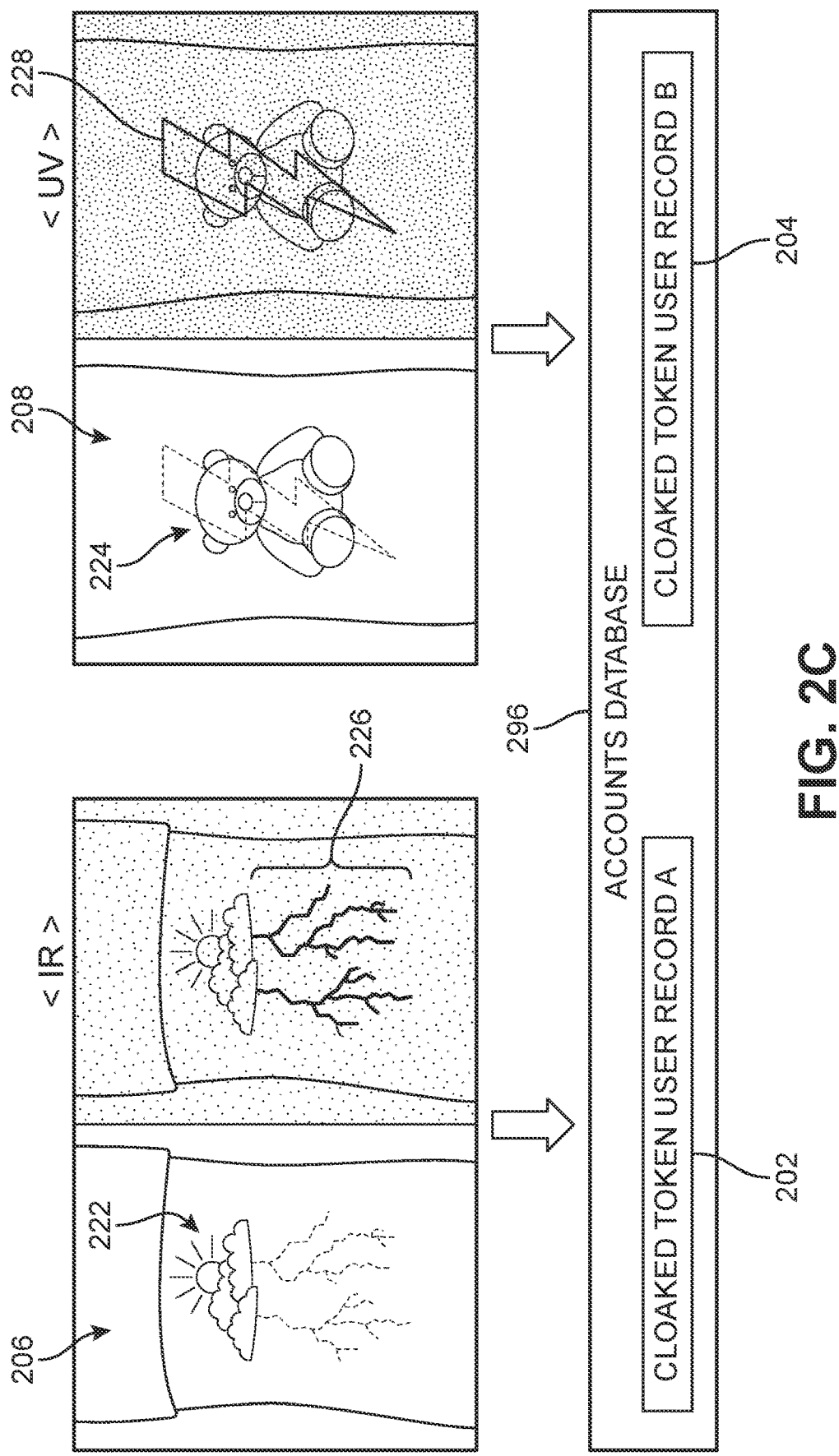

In order to provide the reader with a greater appreciation of the embodiments, FIGS. 2A-2C depict an overview of an embodiment of an environment 200A, 200B, and 200C of an access management system architecture in which user image data is captured and used to determine an authenticity of the video. The two figures are separated for purposes of clarity, such that the two drawings represent a single diagram. It should be understood that the environment (200A, 200B, 200C), collectively referred to as environment 200, is presented is for purposes of illustration only, and other embodiments may utilize different or additional components or processes. The environment 200 may alternatively include additional, fewer, or different components. For example, the environment 200 may include additional storage devices, additional servers, additional computing devices, and other features not shown in FIGS. 2A-2C.

As shown in FIG. 2A, the environment 200 includes a participant computing device ("participant device") 230 that is configured to communicate with an agent computing device ("agent device") 210, for example via a Wi-Fi, cellular, or other network connections 290. The networks 290 may comprise any number of electronic devices and use any number of communication protocols to facilitate data communications within the network 290. One having skill in the art would appreciate that the network 290 may include a variety of internal and/or external networks 290 of various types implementing various data communications technologies. The communication over the network may be performed in accordance with various communication protocols such as Transmission Control Protocol and Internet Protocol (TCP/IP), User Datagram Protocol (UDP), and IEEE communication protocols. The networks 290 can include a wireless (e.g., Wi-Fi, Bluetooth®) or wired data network, a cellular network, a telecommunications network, an enterprise network, an application-specific public network, a Local Area Network (LAN), a Wide Area Network (WAN), WLAN, MAN, a private network, a public network such as the Internet, an ad-hoc network, a network that includes a satellite link, or another type of data communication network. The network 290 may include a physical and/or logical architecture defined by firewalls, proxy servers, routers, switches, or similar features that implement various levels of security and my function as logical gateways or boundaries. While the various components of environment 200 are shown as being accessed through a cloud network and/or stored on a cloud-based server in FIGS. 2A and 2B, in other embodiments some or all components or modules described herein can reside in participant device 230 and/or agent computing device 210.

In different embodiments, the participant device 230 includes a device display ("display") that can present information and media for a product/service, for example via a videoconferencing-chat messaging or other communication application ("app") 238 that can connect the participant with the support agent. For example, a customer can receive and send information through a user interface 232 for app 238 that may be presented on the device display. Although the app 238 is shown as residing on participant device 230 in FIG. 2A, it should be understood that the app 238 can be a web-based application that is accessed from the device via network 290.

The user interface 232 and display may represent a common component or may represent separate physical or functional components. In some embodiments, the display may be a touchscreen, allowing the customer to interact with the user interface directly by touch. The user interface may refer to an operating system user interface or the interface of one or more software applications that may run on the participant device 230. In addition, in some embodiments, when the user launches the app 238 on participant device 230, they may be shown an option to initiate a screen sharing function, whereby content currently being displayed on the participant device 230 is transmitted to the agent computing device 210, or a videoconferencing functionality. In some embodiments, the user interface 216 can include a messaging window or other chat-space by which the support agent may send text messages or other digital content. Alternatively, in some embodiments, the customer can also speak with the support agent via a voice calling application on participant device 230, or directly through a telephone or other external device, such as a cell phone or more general videoconferencing system.

Thus, as a general matter, agent device 210, participant device 230, and the authentication system 250 (see FIG. 2B) can be configured to work in conjunction with the telephony/videoconferencing application ("application" or "app") such as a teleconferencing software application. For example, implementations described herein may be performed via any electronic communications between an agent and a customer including, but not limited to, telephone, video telephone, chat (e.g., IM, Slack™, Jabber™), video chat (e.g., Skype™, MS Teams™, Zoom™, Facetime™), internet based meetings (e.g., WebEx™), custom call-center systems, and other conference call systems. In addition, application can be configured to present various interfaces by which administrator or other users can interact with features of the system 250 (see FIG. 2B). In addition, the app 238 running on participant device 240 can include additional components enabling features by which control signals received from the authentication system may be executed. In other embodiments, the components can be configured as a simple software execution mechanism which receives, translates, and presents output in response to signals transmitted by the authentication system. In other embodiments, the app 238 is unnecessary, and the features described herein can be performed completely by the authentication system 250 based on image data received via other sources such as conventional videoconferencing and telephony applications (e.g., Zoom®, Teams®, Slack®, etc.) or a standard telephone.

Although not shown in FIG. 2A, it should be understood that a virtual or human support agent can be connected to and interact with customers via a call management or customer support server that can manage the distribution, transfer, and handling of various calls that come into the support center. For example, a customer may be routed via the customer support server to an appropriate agent computing device associated with a particular member service representative (MSR) better suited to respond to the particular caller. In different embodiments, the agent device 210 can be connected to or include an internet customer interface for providing support specifically to customers or members who contact them via the Internet. As a general matter, support agent can refer to any person or personnel who offers the caller (or person who was called) assistance, and has access to features of the system 250 during the communication session with the customer.

During the communication session between the participant and the agent, control signals may be transmitted from the authentication system that cause an image capture device ("camera") 234, which is equipped to capture IR and/or UV image data, of the participant device 230 to capture image data 214 from the participant. In other words, the camera 234 includes an ultraviolet light imaging module and/or an infrared light imaging module, and a visible light imaging module. Each of camera modules may include optical elements arranged to guide, focus, filter and/or otherwise direct light onto one or more photosensitive components.

In different embodiments, an ultraviolet (UV) camera module may, for example, be a corona detection imaging system or a solar-blind UV camera module with a high sensitivity silicon imaging sensor such as an electron multiplied charge-coupled-device (CCD) sensor or a scientific complementary metal oxide semiconductor (sCMOS) sensor (as examples). The imaging sensor may be processed so as to have enhanced responsivity in a portion of the UV region of the electromagnetic spectrum such as the UVc band (e.g., between 100 and 280 nanometers) to reduce the solar background for daytime imaging, as well as the anthropogenic background of near-UV, visible and infrared wavelengths that contribute to the background seen by a silicon sensor. The enhanced UVc quantum efficiency of UV camera module can be implemented by using, in some embodiments, back-thinning processes, backside illumination arrangements, and/or coating the sensor with a wave-shifting coating that converts UVc wavelength light to visible wavelengths where the inherent quantum efficiency of a silicon sensor is higher. An imaging sensor based on gallium nitride (GaN) detectors may, in some embodiments, include avalanche photodiode detectors to provide increased signal gain. In one embodiment, GaN detectors may be coupled to a relatively low noise readout integrated circuit (ROIC) (e.g., a ROIC having relatively small integration capacitors in comparison with conventional readout integrate circuits) that allows relatively high signal gain to be used without undesirably increasing readout noise. GaN detectors may be operated using an operating voltage that is relatively high compared to other types of focal plane arrays (e.g., InGaAs focal plane arrays) due to the relatively high bandgap energy of GaN detectors. In one embodiment, the UV camera module may also include a bandpass filter that transmits UVc radiation and rejects other wavelengths of light such as light having wavelengths longer than ~290 nm.

In addition, an infrared (IR) camera module may include any type of infrared camera adapted to detect infrared radiation and provide representative data and information (e.g., infrared image data of a scene). As examples, IR camera module may represent an infrared camera, a dual band imager such as a night vision imager that operates to sense reflected visible, near infrared (NIR), and/or shortwave infrared (SWIR) light for high resolution images and/or mid-wave infrared (MWIR) light, and/or long-wave infrared (LWIR) radiation for thermal imaging, or an imager for sensing both short wave and long wave radiation simultaneously for providing independent image information. In one embodiment, the IR camera module may be a thermal imaging camera module that includes one or more image detector elements such as infrared photodetector elements (e.g., any type of multi-pixel infrared detector, such as a focal plane array) for capturing thermal image data such as infrared image data (e.g., still image data and/or video data) representative of a scene. Furthermore, in different embodiments, the camera 234 may include an illumination source that is used to generate visible and/or infrared light and/or blacklight to illuminate a portion of a scene for imaging.

Thus, the camera 234 can acquire visible as well as UV and/or IR light image information. The authentication system can use the image information to identify a user's cloaked token using face recognition, edge detection, motion detection, body outlines, infrared imaging, or other known means for identifying areas of interest. For example, the camera 234 can identify a person as an area of interest, separate from a background, using face recognition and edge detection. As another example, if the user is close, the camera 234 can use edge detection to outline the shape of a body part (e.g., hand, arm, neck, wrist, cheek, forehead, etc.) as an area of interest. The camera 234 can also display an outline on the user's computing device display and display instructions prompting the user to place the area of interest inside the outline, and to indicate when the area of interest is there. For example, the display could present an oval outline, representing a face, and ask the user to "please align the oval with the person's face."

In some embodiments, the image data capture is configured to occur in response to a data capture control signal 216 generated by the authentication system. In some embodiments, the data capture control signal 216 is automatically triggered by the authentication system 250 automatically in response to a selection or request by the user for access to a secured resource requiring additional verification. In another embodiment, the agent can initiate the data capture manually, for example in a case where video or other forgery is suspected during the call.

Referring to FIG. 2B, in different embodiments, authentication system ("system") 250 is configured to receive a user request for access to secured resources 294 associated with a user account in user accounts database 296. In different embodiments, the system 250, agent device, and/or participant device may include one or more processors, non-transitory machine-readable storage media, and a data communication interface (e.g., NIC card), as well as user interface devices, for example, a monitor, touchscreen, mouse, or keyboard. These components can be implemented as computing devices or mobile devices, such as smart phones, personal digital assistants (PDAs), portable media players, smart watches, smart glasses, smart jewelry, smart apparel, laptops, notebooks, tablets, and others, and can include work stations, mainframes, non-portable computing systems, devices installed in structures, vehicles, and other types of installations.

In some embodiments, the system 250 is capable of communicating with external devices such as agent device (also referred to herein as an administrator computer) and the participant device through the network 290 using wired or wireless communication capabilities. The system 250 can be understood to comprise a cloud-based server and, along with the agent device, may include computing devices comprising any number of components, such as a Network Interface Card (NIC), allowing the respective devices to receive, transmit, process, and store information obtained from the image capture devices. In other words, the system 250 may include groups or subgroups of computing devices that can communicate with each other, but not necessarily with the computing devices in other groups or subgroups. The system 250 may include computing devices of disparate types, having different types of hardware and software configurations and in a variety of different locations. In some cases, multiple devices or subsystems can be identified together as a single computing device.

In different embodiments, the system 250 includes or is configured to access one or more databases, such as member profiles or user accounts database 296, and enable access to secured resources 294. The user accounts database 296 is a content library that stores account data related to one or more users. The data may include, for a plurality of users, name, personal and professional details, current and past policy for the user, credit limit of users, among other details. The database 296 can further include connection information for known (registered) user devices for which the user has authorized and enabled the input and execution of a control signal. In one embodiment, the registry maintains a listing of one or more computing devices for each end-user subscribed to the token-based authentication feature. In different embodiments, the database 296 therefore includes a protocol providing communication with the app running on the user's devices. It can be understood that the end-user has also provided consent to the system for remote access and control of each of these registered devices as appropriate for authentication purposes.

As will be discussed further below, a token repository associated with accounts database 296 can store one or more reference cloaked token user record(s) 284 that include one or more 'invisible' visual features that may be used for verification purposes. During enrollment to the authentication service, a user's invisible tattoo will be recorded and stored for later use by the authentication system 250. In different embodiments, the cloaked token can represent content encoded in the user's skin and, in some embodiments, further obscured by a visible tattoo which can serve an important function (see below). For example, the encoding scheme may be such that the encoded content visually blends together with any text and graphics of a visible tattoo. In another embodiment, the encoded content is completely hidden from the viewer by the nature of the ink used, and no additional visible tattoo is applied.

In different embodiments, the cloaked token can correspond to a tattoo marking that may be as small as approximately 0.1 inch. The mark could, for example, comprise shapes, symbols, numbers, lines, or letters such as a diamond, "X", dot, circle, "+" sign or any other desired shape regardless how complex or simple. Due to their shape, some marks, such as a "+" sign, establish a two-dimensional X-Y coordinate reference system thus requiring only a single marking. In contrast, a dot typically requires more than one mark to establish an orientation. For example, three dots may be positioned substantially equidistant from one another on a user's hand, with the dye or ink used for the tattoo or marking being outside the visible spectrum. The selected design can be automatically provided and/or randomly generated by the authentication system. In some cases, the user can privately select a design and have a cloaked token tattooed on their skin, and then provide the selected design to the system for subsequent authentication sessions.

An example of this process for two different individuals is shown in FIG. 2C. In this illustration, a first person 206 with an optional first visible tattoo 222 (clouds) and first cloaked token 226 (lightning) that is only exposed and visible under IR light is depicted. In addition, a second person 208 with an optional second visible tattoo 224 (bear) and a second cloaked token 228 (lightning) that is only exposed and visible under UV light is also depicted. Lightning is shown simply as an example of an invisible tattoo, and any other image, marking, symbol, character, etc. may be used. Each of first person 206 and second person 208 have selected the tattoo images or graphics to correspond to their own personal style and aesthetic. The invisible (cloaked) portion of the tattoo that serves as the token can thus embellish or enhance the visible portion, allowing the user to enjoy the tattoo-token outside of the authentication function. However, this type of pairing of visible+invisible marking is not necessary for purposes of the system, and a person can elect to have only the cloaked token on their skin without a visible tattoo.

In this example, the first person 206 and second person 208 access the authentication system and submit an image capture of their respective cloaked tokens. The system receives these images and stores the first cloaked token 226 as a cloaked token user record A 202 associated with or linked to the account for the first person 206, and the second cloaked token 228 as a cloaked token user record B 204 that is associated with or linked to the account for the second person 208.

In different embodiments, a photo-chromatic ink can be employed for the embedding of the cloaked token. A photo-chromatic ink is typically invisible until brought into contact with light of a particular wavelength. However, although the examples described herein present cloaked tokens applied with a photo-chromatic ink, in other embodiments, other types of 'hidden' inks can be used. For example, a thermo-chromatic ink that changes color as the ink temperature changes can be used. Generally, below an activation temperature the ink is one color and above an activation temperature the ink lightens or become clear. As the ink cools, the original color returns. For example, a purple ink may become pink at a skin-surface temperature below activation temperature and then return to purple when cooled. In other embodiments, above activation temperature, the thermo-chromatic ink may become transparent, revealing an image formed underneath. A normal temperature of skin in an ambient, wind-sheltered environment is generally considered to be between about 88 and 94° F. In some embodiments the activation temperature is below this ordinary ambient skin temperature (e.g., under 87° F.), and exposure to cold such as air-conditioned air or an ice pack or other cold item can trigger the presentation of the cloaked token.

In another example, the cloaked token can be embedded using a hydro-chromatic inks. Suck tokens are generally applied as a white ink over a pre-existing image. The ink is activated by water such that when water is applied, the white ink disappears and the image behind the ink appears. When the water dries, the image goes back to white. A person of ordinary skill in the art will readily recognize the wide variety of visual effects which may be achieved by mixtures and superimpositions or layering configurations of the various "reveal-type" image inks activated by one or more of temperature, wavelength of light, and water. Thus, any ink which is obscured or hidden and then revealed or otherwise changed upon occurrence of a triggering environmental condition may be employed.

Returning to FIG. 2B, as a user seeks access to secure resources 294, the authentication system 250 can obtain image data that includes the user's face and/or other portion of their body in which skin can be seen. The authentication system 250 receives the image data at a token detection module 260, and processing via an image processing module 262 is performed. In different embodiments, image signal processing algorithms and/or software (e.g., image processing module 262) can perform pre-processing and processing of the captured image data. For example, the image input can be cleansed and normalized by the image processing module 262. In different embodiments, various image processing algorithms and/or software may be used with captured image data. In one embodiment, the image processing algorithms perform compression, artifact correction, noise reduction, color corrections, geometric corrections, imager non-uniformity correction, etc., and various image processing enhancement operations on the image content. The algorithms can be implemented as software running on a processor, DSP processor, special purpose ASIC and/or FGPA's. The image processing algorithms can also be a mixture of custom developed algorithms and libraries. The image processing algorithms can further be arranged in any logical sequence, with potential changes in the sequence of processing or parameters governing the processing determined by image type, computational requirements or outputs from other algorithms. In another embodiment, one or more of the operations of image processing module 262 can be performed by image processing components of the participant device before the image data is sent to the system 250.

In some embodiments, image processing may also include machine learning techniques that can be used to discriminate between features and to identify objects, for example via image recognition and object detection software. Such techniques may also include machine vision algorithms that perform, among other operations, symbol and logo recognition, general shape recognition, as well as object classification. The machine vision algorithms may reside on a different system belonging to a different entity than the image processing algorithms or the application software. The machine vision algorithms, which are applied to identify an object in the digital image, may include computer vision algorithms such as image analysis algorithms that may use a feature detector or a combination of detectors. For example, texture detectors and edge detectors known to those skilled in the art may be used. If both specific texture and specific edges are detected in a set of images, then an identification may be made. One non-limiting example of an edge detection method includes the Canny™ algorithm available in computer vision libraries such as Intel™ OpenCV. Texture detectors may use known algorithms such as texture detection algorithms provided by Matlab™. Some non-limiting examples of object detection algorithms include R-CNN, SPP, Fast R-CNN, Faster R-CNN, Feature Pyramid networks, RetinaNet (Focal loss), Yolo Framework—Yolo1, Yolo2, Yolo3, and SSD.

Once the image data has been processed, relevant features may be extracted for use as input for a cloaked token detector 288. A wide range of algorithms for classifying a given pattern are available. For example, cloaked token detector 288 may divide the face or other body part of the user into many small-size grids, and the features from all these grids are concatenated to identify any markings. In some embodiments, cloaked token detector 288 is configured to scan or evaluate the video in real or near-real time to identify segments of the image in which there is a greater likelihood of a token being present. In some embodiments, a visible tattoo serves as a location anchor and the system is configured to extract and/or focus on the region in the image where the visible tattoo is in order to detect whether the cloaked token is also present. Thus, the use of such an anchor allows for less intensive computing power and time needed for the detection of the token.

In other cases, in particular in cases where there is no visible tattoo identifying the target region, the user may move their body toward the field of view of the camera to ensure optimal presentation of the region in which the cloaked token is embedded. In another example, the system 250 can access the accounts database 296 and retrieve cloaked token user record 284 for the purported account holder. This record 284 can in some embodiments include information regarding the location and pose of the cloaked token on the user, which the cloaked token detector 288 can use to correctly identify the target region on which the cloaked token should appear. In other words, a visible tattoo can represent a feature that is easily seen and used to establish a landmark or reference indicator for where the invisible tattoo is located. The target region of interest (ROI) of the image where the token is embedded (or should be embedded) is then received by token validity determination module 270.

Thus, in different embodiments, at a time prior to the authentication session, an enrollment session occurred in which one or more personalized token reference patterns for an individual user have been obtained and stored as a cloaked token user record for the account, and subsequent access sessions can conduct verification processes based on the stored patterns. When a user requests access to a secured resource, for example via a user interface presented on participant device 230 over network 290 (see FIG. 2A), data capture control signal 216 may be generated by system 250, causing recording of the user by an IR-enabled or UV-enabled camera, which will be processed for comparison to the stored pattern. In one example, the previously captured and stored cloaked token user record 284 can inform the image processing module 262 and/or cloaked token detector 288 of the expected location of the designated target region for the received image data (e.g., the user's right cheek, left arm, neck, etc.) to extract or focus its search for the cloaked token. In one embodiment, a visible tattoo serves as a landmark to guide the system 250 to the correct location on the user's body or identifying the image region of interest. In some embodiments, the image data is processed and models or representations of the image are built. These models are compared against one another. In different embodiments, a sample may be deemed unacceptable or unusable if the image is too bright or too dark, or if there is too much noise (poor signal to noise ratio). If a sample is not acceptable the system may request an additional or further sample.

In one embodiment, the system 250 is configured to compare the information in the received image data (exposed to non-visible light) against the reference pattern via token validity determination module 270. If the image data is acceptable or sufficient, a scoring occurs via the token validity determination module 270. The scoring process is analogous to "what is the probability that the region of interest captured by the camera is presenting the expected markings as the reference sample stored in the cloaked token user record for the user?" Thus, in some embodiments, the determination of a "match" is not necessarily based on the verification/reference sample directly or exactly matching the content of the image sample, but rather on the two samples being substantially similar or sharing particular features. The returned score is evaluated against a threshold value to determine if it meets or exceeds the minimum acceptable score by authenticity determination module 274. If the score is determined to represent a successful match, authenticity determination module 274 may allow a user to proceed further within a call center or telephone banking menu system or other secured resource 294 being safeguarded by the service provider, for example via access gateway 292.

Once a match is found or is in an acceptable range, the access to secured resource(s) 294 by the user will be allowed and/or enabled via access gateway 292. Otherwise, access is denied, or blocked pending further verification. In some embodiments, the system is configured to then automatically generate a message indicating an unauthorized attempt to access the secured resource may have occurred. In some embodiments, this message can be automatically transmitted by the platform to the user's account address or other communication channel on record in accounts database 296 for the registered user.

Alternatively, or additionally, the cloaked token itself can include characteristics or features that provide the data necessary to authenticate the user. For example, in different embodiments, the cloaked token represents or corresponds to an encoded physical medium that will include identifier data. For purposes of this disclosure, a cloaked identifier is a type of cloaked token in which content is encoded in a region of the person's skin, and may include text and/or graphics. The encoded content can take any of a variety of forms, dependent upon such things as the encoding scheme and the authentication service provider, a barcode, an alpha-numeric code, a pattern, etc. The content may include computer instructions, a uniform resource locator (URL), and other user-specific data. In some embodiments, a person may request the service provider present options for cloaked tokens, and choose from a token that is aesthetically pleasing when revealed while at the same time includes encoded content. In one embodiment, the encoded content can be applied to a user's skin via a computer-controlled, programmed (robotic) tattoo tool to ensure the correct content is embedded in the user's skin. In one example, the cloaked token can include a particular marker indicating that certain information is encoded in the design. In some embodiments, an encoded cloaked token can use various mediums to communicate data to an authentication system. In one example, the cloaked token can comprise multiple colors or wavelengths. The camera captures an image of the token and the system decodes the content by measuring the intensities of each encoding color detected. The colors may be selected from outside the visible light range (e.g., infrared colors) or may be a combination of visible and invisible colors.

In such embodiments, cloaked token data extractor 264 is configured to 'read' or otherwise decode the data carried by the cloaked token. This data is compared to the data for the user stored in a record in user data reference 286. If the token data aligns with the user data, authenticity determination module 274 may allow a user to proceed further within a call center or telephone banking menu system or other secured resource 294 being safeguarded by the service provider, for example via access gateway 292.

In other words, if the image data includes a cloaked token with an appearance that matches the cloaked token stored in accounts database 296 within certain parameters, or if the image data includes a cloaked token that carries a specific type or set of data that can be used to identify the accountholder, the user is deemed to pass the authentication test, which indicates with a high likelihood that the user is indeed the account holder or other authorized person. Access can then be automatically granted, or the process can serve as a supplementary security measure along with conventional security identifiers.

It should be understood that a support agent (human or virtual) can be connected to and interact with customers via a call management or customer support server that can manage the distribution, transfer, and handling of various calls that come into the support center. For example, a customer may be routed via the customer support server to an appropriate agent computing device associated with a particular member service representative (MSR) better suited to respond to the particular caller. In different embodiments, the agent device 210 can be connected to or include an internet customer interface for providing support specifically to customers or members who contact them via the Internet. As a general matter, support agents or service representatives can refer to any person or personnel who offers the caller (or person who was called) assistance, and has access to the system 250 during the communication session with the customer. In one example, rather than automatically providing access to the account, the authenticity determination module 274 can generate a communication for the human agent to review that includes the results of its determination. The human agent can then, based in part on the system's authenticity determination, decide to provide access to the secured resources 294.

Figure 3:
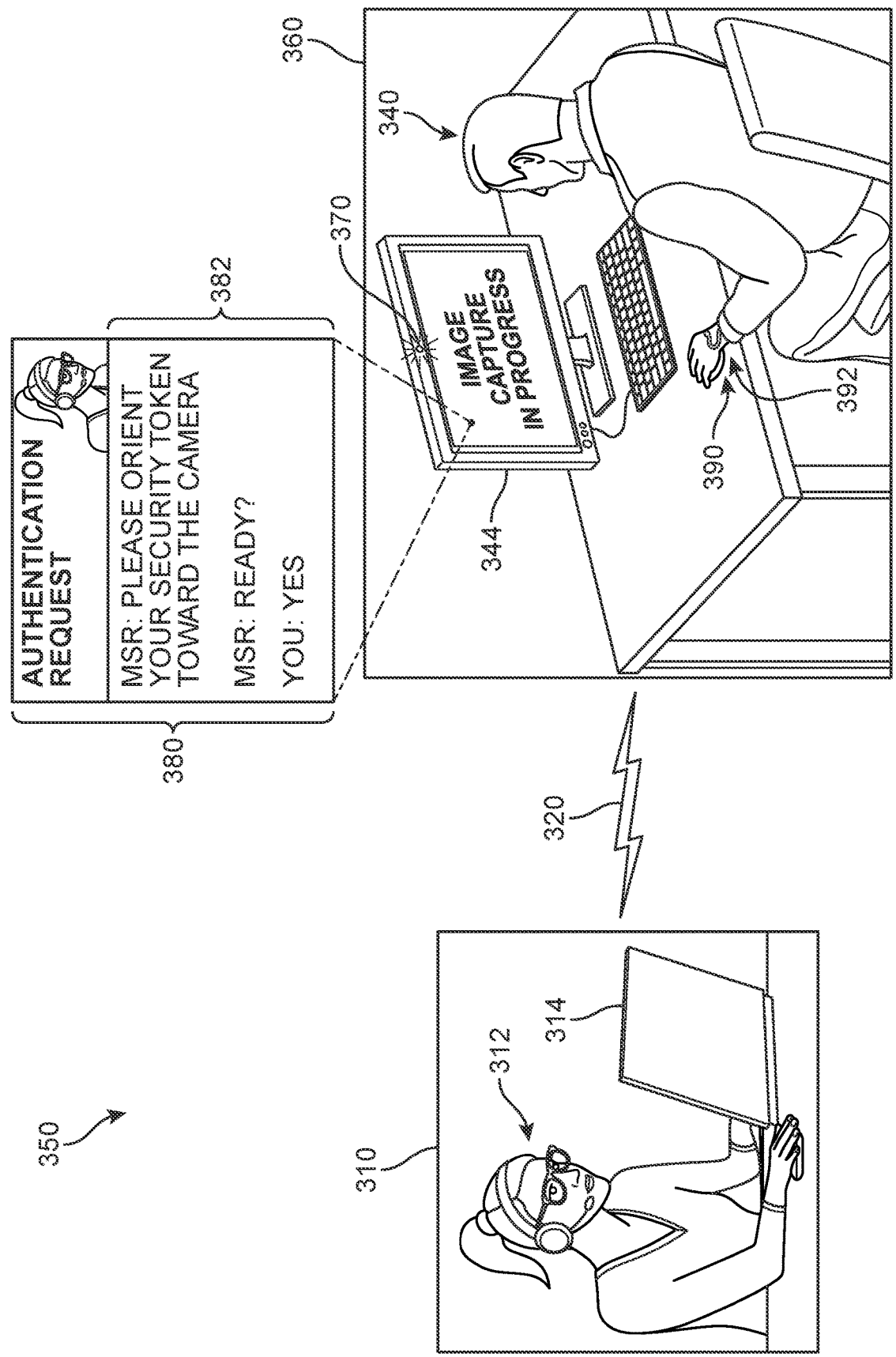
FIGS. 3-6 depict an example in which a person is engaged in a video communication session with a service representative and is seeking access to a secured resource based on the presence of a cloaked token, according to an embodiment.

Referring now to FIGS. 3-6, an example of an authentication scenario occurring during a communication session 350 between a second user 340 and a first agent 312 is depicted. In FIG. 3, the second user 340 is, via a first computing device ("first device") 344 at a remote location 360, interacting with the access management platform and communicating with the first agent 312 via network 320. The second user 340 also has a tattooed region 392 on his wrist 390. The first agent 312 is communicating with second user 340 via a third computing device ("third device") 314 located at a remote site 310 such as a call center or other business.

For purposes of this example, the second user 340 has requested access to secured resources associated with a user account managed by the entity which first agent 312 is representing. In this case, a first user interface ("first interface") 380 provides a first chat window 382 to allow the second user 340 to partake in an instant messaging session with the second first agent 312 ("Authentication Request-MSR: Please orient your security token toward the camera/MSR: Ready?/YOU: Yes"). In other embodiments, the communication can occur in part or fully via a video conferencing interface whereby the first agent 312 and second user 340 speak in real-time over a video screen. Once the second user 340 provides his consent, an image capturing event is automatically triggered by the system or initiated by the first agent 312, and image data collected by an image sensor ("camera") 370. In different embodiments, the camera 370 includes components for enabling capture of IR-image data and/or UV-image data.

Thus, in different embodiments, it can be understood that a user can communicate via an interface generated by an application provided by access management system. The application can offer a user interface that may be accessed via any user computing device configured for connection to a network. In different embodiments, the application can be configured to offer content via native controls presented via an interface. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video or other media associated with a user interface, or other such information presentation.

Figure 4:
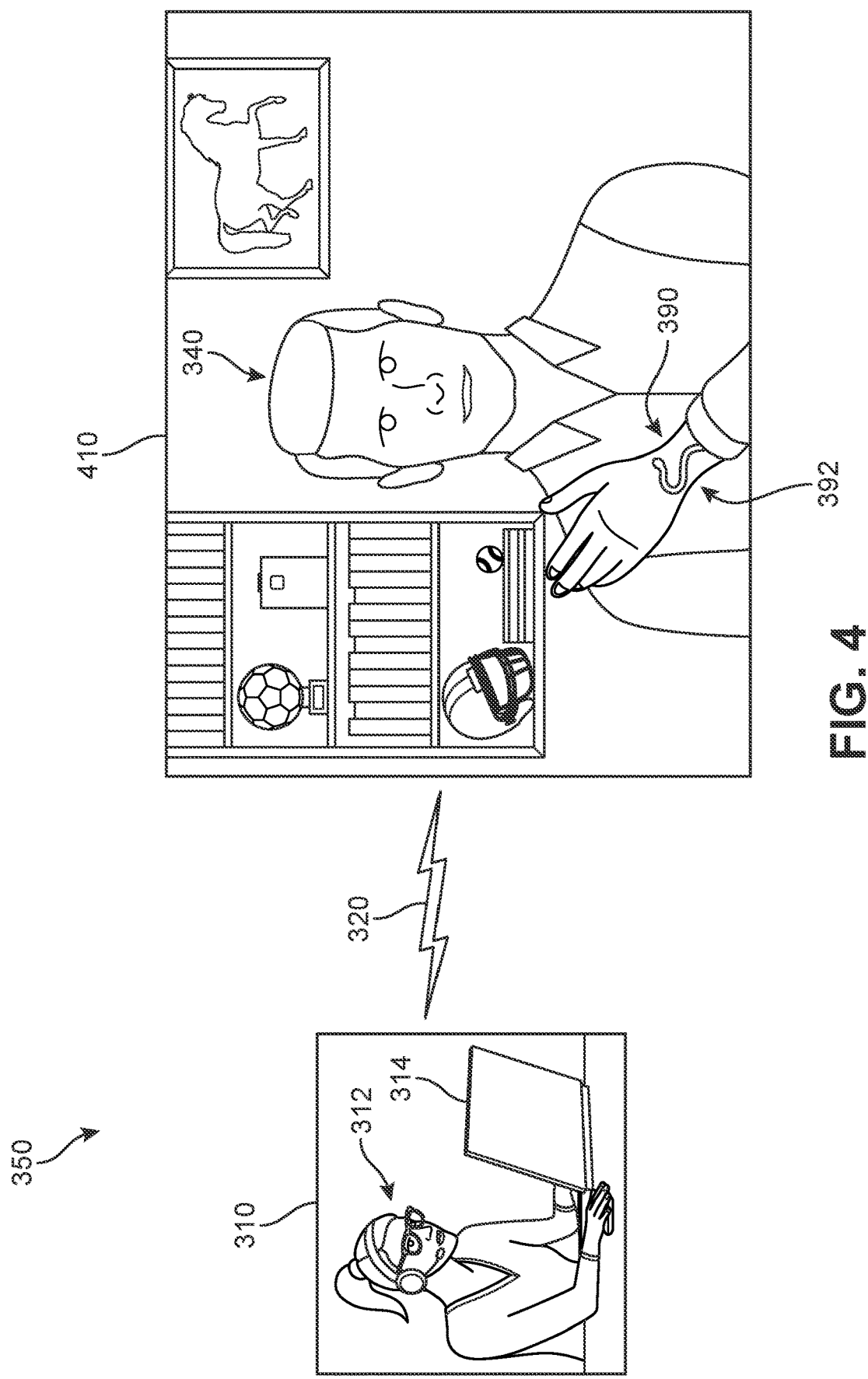

In FIG. 4, a depiction of a scene 410 as received by the system and/or first agent 312 during the teleconference at the third device 314 via network 320 is shown. The second user 340 has positioned himself in front of a camera for the first device (see FIG. 3). In addition, per the authentication request, the second user 340 moves in order to adjust the pose of his arm and hand (wrist 390) to be in the field of view of the camera. This allows any information that is incorporated in the token to be presented in the field of view of the camera. For purposes of this disclosure, a pose refers to an object's estimated position and orientation in three dimensions, where position may be specified by linear measurements with respect to orthogonal 3D axes such as X, Y, and Z, and orientation may be specified by angular measurements around the 3D axes, such as by the angles $\theta_x$, $\theta_y$, and $\theta_z$, corresponding to angular measurements with respect to the X, Y, and Z axes, respectively. A pose may be indicated or specified by the vector [X, Y, Z, $\theta_x$, $\theta_y$, $\theta_z$].

Figure 5A:
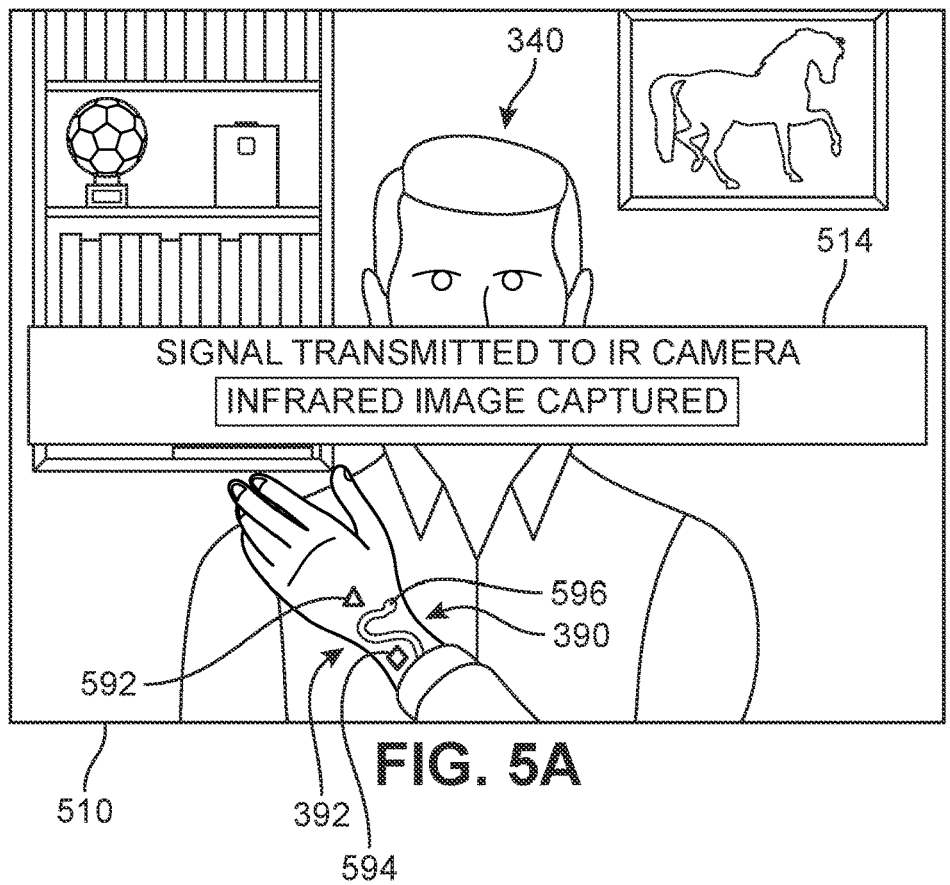
Figure 5B:
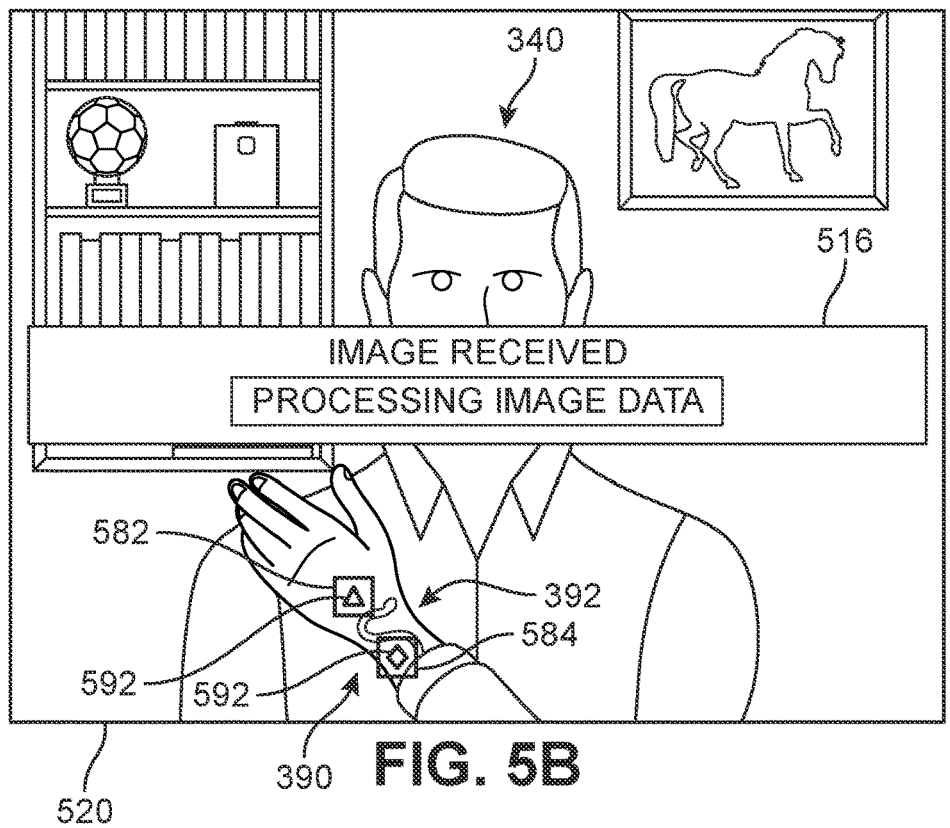

At this time, the app can cause the user's camera to capture first image data 410. The user's wrist 390 in this case can be seen to include a tattooed region 392 on the skin of his forearm and hand. Referring to FIG. 5A, the system transmits a control signal over the network to the user device, and the app captures an infrared image 510, as indicated a first status message 514. In this illustration, it can be observed that the infrared image 510 differs from the previous scene 410 in FIG. 4 in that the tattooed region 392 includes not only a visible tattoo 596 (shown as a snake) that was apparent in scene 410, but additional, previously cloaked and invisible markings comprising a first marking 592 (a triangle) and a second marking 594 (a square). In FIG. 5B, the system initiates processing of the image to produced processed infrared image data 520, as indicated by a second status message 516. In this stage, the region of interest has been detected, in this case by reference to the visible tattoo. In some embodiments, boundary boxes can more specifically identify cloaked tokens regions, such as first box 582 and second box 584, which are extracted and used to determine whether the entire cloaked token including each marking is present.

Figure 6:
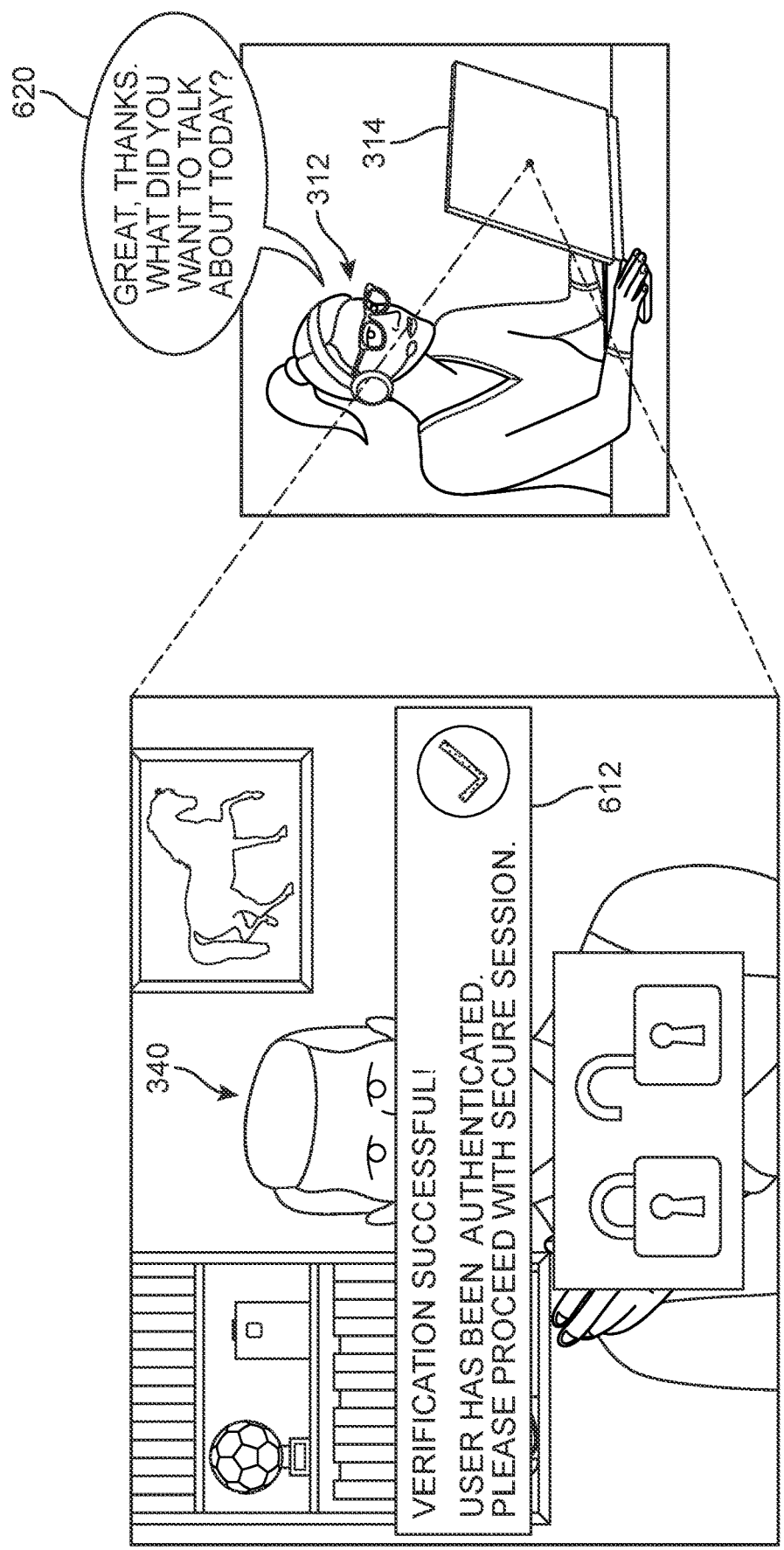

In different embodiments, the system can receive the image data and automatically detect the presence of the cloaked token. In some embodiments, the configuration of the cloaked token (e.g., the size, pattern, shape, color, line thickness, etc.) is known to the system, obtained during registration of the user's tattoo in the user profile. In FIG. 6, the cloaked tokens have been determined to be similar enough so as to be classified as a match, as indicated by a third status message 612 ("Verification successful! User has been authenticated. Please proceed with secure session") presented to the agent. The system can then automatically enable or grant the second user 340 to access the secured resource, or the agent can respond to the verification by manually enabling access. In this example, the first agent 312 manually allows access to the accountholder's data by message 620 ("Great, thanks. What did you want to talk about today?").

Figure 7A:
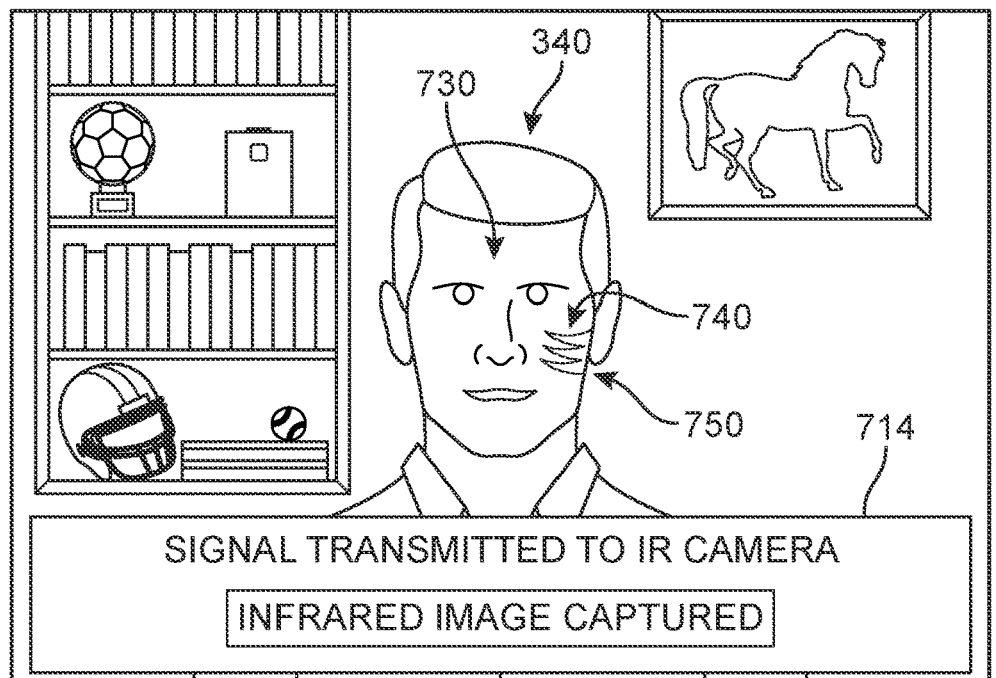
FIGS. 7A and 7B depict an enrollment process for a user based on their cloaked token, according to an embodiment.
Figure 7B:
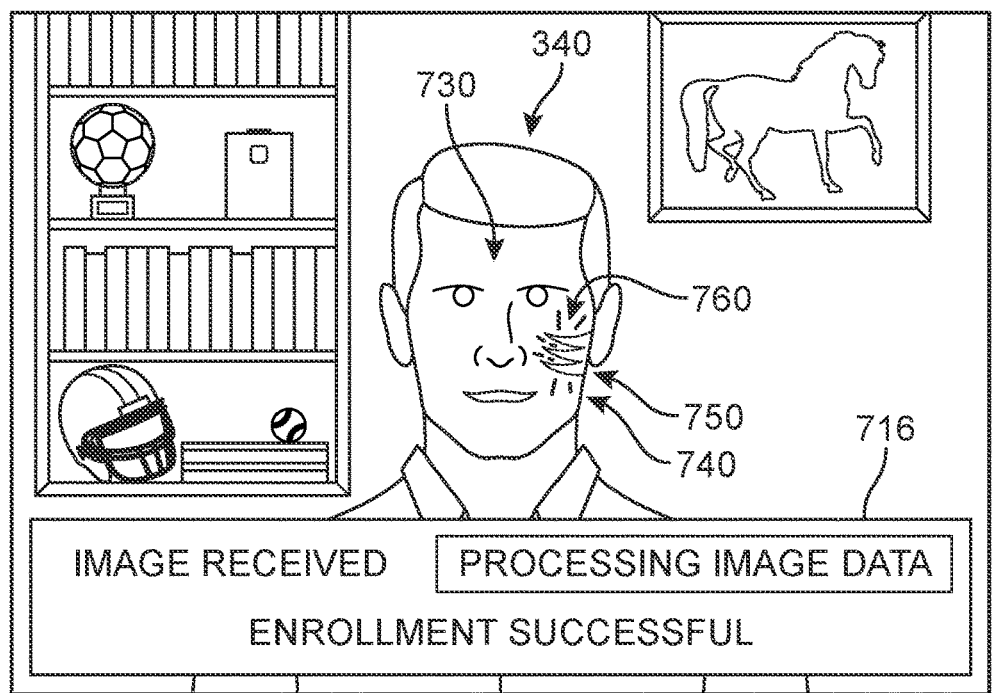

Referring now to FIGS. 7A and 7B, an example of an authentication token enrollment scenario is depicted. In FIG. 7A, the second user 340 is, via the second device of FIG. 3, interacting with the access management system app and communicating with the enrollment module over a network. For purposes of this example, the second user 340 has requested to enroll in the tattoo (token) based authentication system. In this case, the second user 340 instead (or additionally) presents his face 730 to the IR-equipped camera to enroll a facial marking 740 on his left cheek 750, in a first enrollment stage 710. A fourth status message 714 ("Signal transmitted to IR camera. Infrared image capture initiated") indicates the system us ready to receive the image data. In FIG. 7B, a second stage 720 depicts the capture of the infrared image data whereby infrared markings 760 are now visible. A fifth status message 716 ("Image received. Processing image data. Enrollment successful") indicates the system has received the image data and generated a cloaked token user record (see FIG. 2B).

Figure 8:
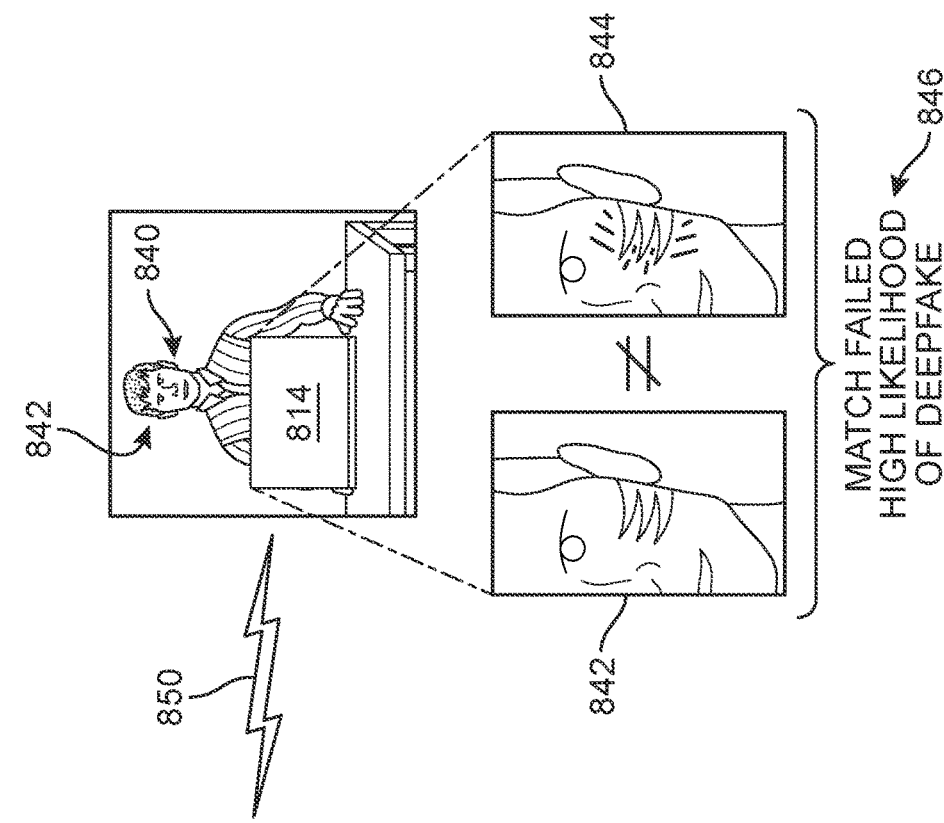
FIG. 8 depicts an example of a system determination that the image data fails to include the expected cloaked token, resulting in the system notifying the agent of a potential deep-fake video, according to an embodiment.
Figure 8:
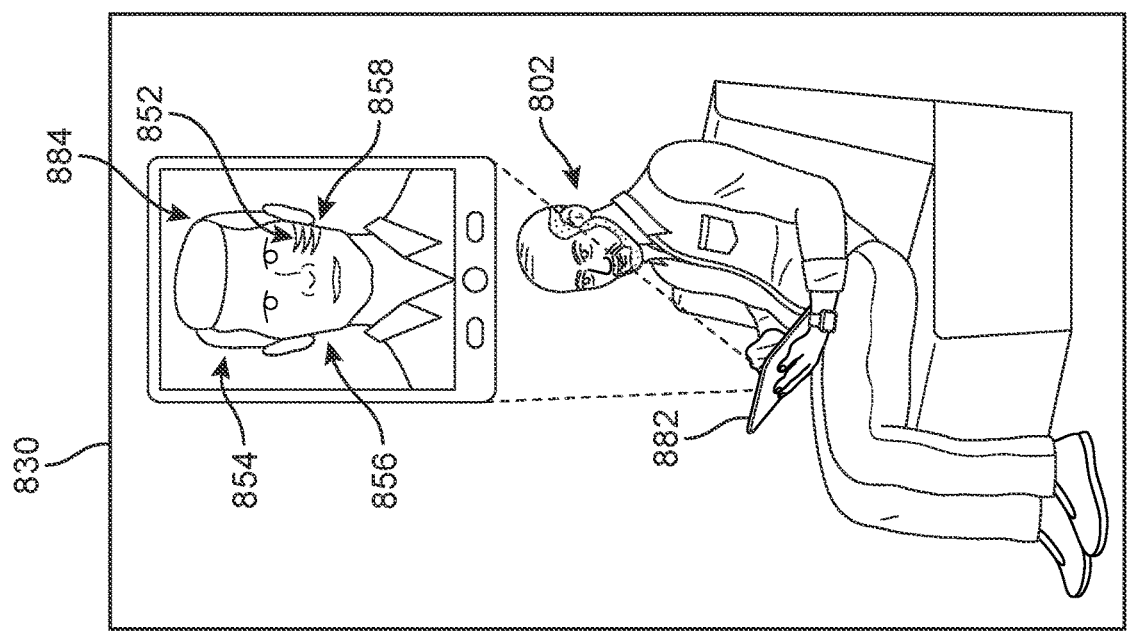

In FIG. 8, an example of an authentication process of a user identity based on the enrollment process shown in FIGS. 7A and 7B is depicted. In this case, a third user 802 is engaged in a communication session with a second agent 840 with a device 814 who is located in a remote location relative to third user 802, such as a call center 842. The third user 802 is speaking to the second agent 840 via a tablet 882 from a location 830. Users of the authentication system described herein can be understood to have provided their consent to the token image-based authentication process at the time of their original account activation or enrollment with the additional security layer procedure, as shown in FIGS. 7A and 7B. The example session in FIG. 8 is occurring at a time subsequent to the enrollment process described earlier. In other words, the account holder (second user) that third user 802 is claiming to be has previously provided image data for one or more cloaked tokens with the goal of enrolling or registering himself in this particular authentication technique, and the cloaked token that was acquired at that time is stored in a record in a database accessible by the depicted authentication system.

As noted earlier, fraudulent calls can readily hide a caller's true identity by use of various spoofing techniques, making such identifications unreliable, including but not limited to deep fake video images and voice simulation as well as location spoofing. However, as shown in FIG. 8, embodiments of the proposed system can be configured to capture image data regardless of the data being forged or altered. The third user 802 has previously obtained a current photograph or video of the second user's face, and is using this photograph to attempt to access the second user's account information via a deep fake image stream 854, which includes a simulation of second user's face 856, cheek 852, and visible tattoo 858, as displayed on screen 884. Unbeknownst to the third user 802, this deep fake image stream 854 is captured over network 850 as simulated image data 842 and submitted to the authentication system. The authentication system determines the simulated image data fails to include the cloaked token present in the previously enrolled image data 844. In other words, the image data has been analyzed, and is unable to detect the correct token, indicated here by a system message 846 ("Match failed! High likelihood of deep fake"). In other words, the system has determined that the image received does not correspond to the account holder's cloaked token, based on a comparison to a reference token submitted by the user at an earlier date. Upon presentation of this result, the second agent 840 can be alerted to greater likelihood of an imposter attempting to fraudulently access the true account holder's secured resources. The deep fake, being taken from a non-infrared sourced image data, does not contain the cloaked token, even if exposed to synthetic infrared light. In other words, the deep fake video cannot include objects that were not visible in the original image upon which the deep fake was generated.

While in some cases the second agent 840 can simply end the communication session, in other cases, the second agent 840 can proceed by either reattempting the authentication process or requesting additional verification information to authenticate the user. In this case, the (imposter) third user 802 may be understood to have stolen or discovered the true account holder's username and password and/or other identity tokens, as well as spoofing the call's location, and a deep fake video with the face of the second user, and was not expecting that any other information would be needed. In some embodiments, the second agent 840 can request additional verification information to overcome the failed match, such as answers to security questions, etc., resecuring the account pending the caller successfully responding to the security question. Thus, the system has thwarted an attempt by an imposter to 'scam' the service provider into allowing access to an account holder's secured resource.

Figure 9:
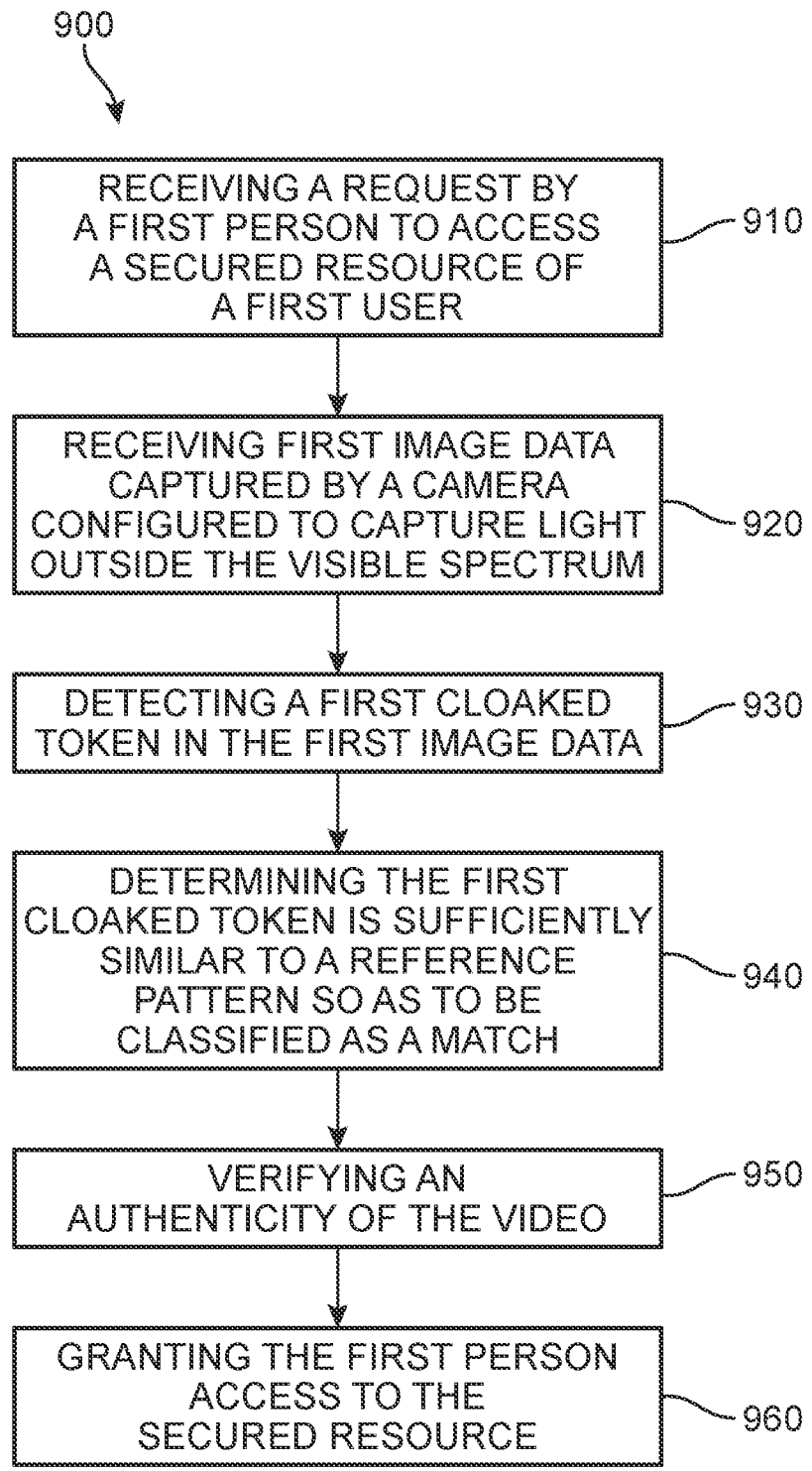
FIG. 9 is a flow chart depicting a process of verifying an authenticity of video in order to protect user resources, according to an embodiment.

FIG. 9 is a flow chart illustrating an embodiment of a method 900 of verifying an authenticity of video in order to protect user resources. The method 900 includes a first step 910 of receiving, at a cloud-based authentication system and from a first computing device, a request by a first person to access a secured resource of a first user, and a second step 920 of receiving at a first time, at the authentication system, first image data captured by a camera of the first computing device (in response to the request by the user), the camera being configured to capture light outside the visible spectrum. In addition, the method 900 includes a third step 930 of detecting, at the authentication system, a first cloaked token in the first image data, the first cloaked token being hidden in visible light and are revealed in a particular band of nonvisible light, and a fourth step 940 of determining the first cloaked token is sufficiently similar to a reference pattern so as to be classified as a match. Furthermore, the method 900 includes a fifth step 950 of verifying, in response to the first cloaked token matching the reference pattern, an authenticity of the video, and a sixth step 960 of granting the first person access to the secured resource for which the first user is authorized (in response to the verification).

In other embodiments, the method may include additional steps or aspects. In some embodiments, the method also includes a step of receiving second image data at a second time earlier than the first time, where the second image data includes image content of a region of bare skin of the first user, and the reference pattern is based on a tattoo captured in the second image data. In another example, the method can further include steps of employing, prior to the first time, a verification process to verify that the first user is associated with a first user identity, generating a record that links the second image data to the first user identity, and storing the record in a database of the authentication system. In different embodiments, the first cloaked token corresponds to a tattoo that has been applied to the region using one of a glow-in-the-dark, ultraviolet, infrared, photo-chromatic, hydro-chromatic, and thermo-chromatic ink.

In some embodiments, the method can also include steps of transmitting, from the authentication system and to the first computing device, a control signal in response to the request from the first person, and causing, via the control signal, the camera to capture an image in either the UV or IR spectrum. In one example, the method also includes detecting, via an application associated with the authentication system, a visible tattoo in the first image data, and causing, via the authentication system and at the first computing device, the camera to focus on the visible tattoo, such that the first image data includes the visible tattoo. In one embodiment, the visible tattoo is overlaid on the cloaked token and represents a landmark for guiding the authentication system to the position of the cloaked token. In another embodiment, the first image data is obtained during a videoconferencing session between the first user and a service representative associated with the secured resource.

Other methods may be contemplated within the scope of the present disclosure. For example, in some embodiments, a method of verifying an authenticity of a video in order to protect user resources is disclosed. The method includes a first step of receiving, at a cloud-based authentication system and from a first computing device, a request by a first person to access a secured resource of a first user, and a second step of receiving at a first time, at the authentication system, first image data captured by a camera of the first computing device, the camera being configured to capture light outside the visible spectrum. The method further includes a third step of detecting, at the authentication system, a first cloaked token in the first image data, the first cloaked token being hidden in visible light and are revealed in a particular band of nonvisible light, and a fourth step of processing, at the authentication system, the first cloaked token in order to extract a digital code from the first cloaked token. In addition, the method includes a fifth step of determining, at the authentication system, that the digital code includes first identification data, a sixth step of verifying, in response to the first cloaked token including the first identification data, an authenticity of the video, and a seventh step of granting the first person access to the secured resource for which the first user is authorized (in response to the verification).

In such embodiments, the method may include additional steps or aspects. For example, in some embodiments, the first cloaked token corresponds to a tattoo that has been applied to the first user's skin using one of a glow-in-the-dark, ultraviolet, infrared, photo-chromatic, hydro-chromatic, and thermo-chromatic ink. In another example, the method can further include steps of employing, prior to the first time, a verification process to verify that the first user is associated with a first user identity, generating a record that links the first identification data to the first user identity, and storing the record in a database of the authentication system. In one embodiment, the first cloaked token includes a barcode.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method of verifying an authenticity of video in order to protect user resources, the method comprising:
  receiving, at a cloud-based authentication system and from a first computing device, a request by a first person to access a secured resource of a first user;
  receiving at a first time, at the authentication system, first image data captured by a camera of the first computing device, the camera being configured to capture light outside the visible spectrum;
  detecting, via an application associated with the authentication system, a visible tattoo in the first image data;
  causing, via the authentication system and at the first computing device, the camera to focus on the visible tattoo, such that the first image data includes the visible tattoo;
  detecting, at the authentication system, a first cloaked token in the first image data, the first cloaked token being invisible in visible light with a wavelength between 400 nm and 700 nm and only revealed in a particular band of nonvisible light with a wavelength below 400 nm or above 700 nm;
  wherein the visible tattoo is overlaid on the first cloaked token and represents a landmark for guiding the authentication system to the position of the first cloaked token;
  determining the first cloaked token meets or exceeds a threshold value to a reference pattern so as to be classified as a match;
  verifying, in response to the first cloaked token matching the reference pattern, an authenticity of the video; and
  thereby granting the first person access to the secured resource for which the first user is authorized.

2. The method of claim 1, further comprising receiving second image data at a second time earlier than the first time, wherein the second image data includes image content of a region of bare skin of the first user, and the reference pattern is based on a tattoo captured in the second image data.

3. The method of claim 2, further comprising:
  employing, prior to the first time, a verification process to verify that the first user is associated with a first user identity;
  generating a record that links the second image data to the first user identity; and
  storing the record in a database of the authentication system.

4. The method of claim 1, wherein the first cloaked token corresponds to a tattoo that has been applied to the region using one of a glow-in-the-dark, ultraviolet, infrared, photochromatic, hydro-chromatic, and thermo-chromatic ink.

5. The method of claim 1, further comprising:
  transmitting, from the authentication system and to the first computing device, a control signal in response to the request from the first person; and
  causing, via the control signal, the camera to capture an image in either the UV or IR spectrum.

6. The method of claim 5, wherein the request from the first person to access the secured resource of the first user is received at the authentication system during a videoconferencing session between the first person and a service representative associated with the secured resource of the first user; and
  wherein the control signal transmitted by the authentication system to the first computing device is triggered automatically by the authentication system and/or upon initiation by the service representative during the videoconferencing session.

7. The method of claim 1, wherein the first image data is obtained during a videoconferencing session between the first user and a service representative associated with the secured resource.

8. A computer-implemented method of verifying an authenticity of video in order to protect user resources, the method comprising:
  receiving, at a cloud-based authentication system and from a first computing device, a request by a first person to access a secured resource of a first user;
  receiving at a first time, at the authentication system, first image data captured by a camera of the first computing device, the camera being configured to capture light outside the visible spectrum;
  detecting, via an application associated with the authentication system, a visible tattoo in the first image data;
  causing, via the authentication system and at the first computing device, the camera to focus on the visible tattoo, such that the first image data includes the visible tattoo;

detecting, at the authentication system, a first cloaked token in the first image data, the first cloaked token being invisible in visible light with a wavelength between 400 nm and 700 nm and only revealed in a particular band of nonvisible light with a wavelength below 400 nm or above 700 nm;

wherein the visible tattoo is overlaid on the first cloaked token and represents a landmark for guiding the authentication system to the position of the first cloaked token;

processing, at the authentication system, the first cloaked token in order to extract a digital code from the first cloaked token;

determining, at the authentication system, that the digital code includes first identification data;

verifying, in response to the first cloaked token including the first identification data, an authenticity of the video; and thereby granting the first person access to the secured resource for which the first user is authorized.

9. The method of claim 8, wherein the first cloaked token corresponds to a tattoo that has been applied to the first user's using one of a glow-in-the-dark, ultraviolet, infrared, photo-chromatic, hydro-chromatic, and thermo-chromatic ink.

10. The method of claim 8, further comprising:

employing, prior to the first time, a verification process to verify that the first user is associated with a first user identity;

generating a record that links the first identification data to the first user identity; and storing the record in a database of the authentication system.

11. The method of claim 8, wherein the first cloaked token includes a barcode.

12. A system for verifying an authenticity of video in order to protect user resources, the system comprising a processor and machine-readable media including instructions which, when executed by the processor, cause the processor to:

receive, at a cloud-based authentication system and from a first computing device, a request by a first person to access a secured resource of a first user;

receive at a first time, at the authentication system, first image data captured by a camera of the first computing device, the camera being configured to capture light outside the visible spectrum;

detect, via an application associated with the authentication system, a visible tattoo in the first image data;

cause, via the authentication system and at the first computing device, the camera to focus on the visible tattoo, such that the first image data includes the visible tattoo;

detect, at the authentication system, a first cloaked token in the first image data, the first cloaked token being invisible in visible light with a wavelength between 400 nm and 700 nm and only revealed in a particular band of nonvisible light with a wavelength below 400 nm or above 700 nm;

wherein the visible tattoo is overlaid on the first cloaked token and represents a landmark for guiding the authentication system to the position of the first cloaked token;

determine the first cloaked token meets or exceeds a threshold value to a reference pattern so as to be classified as a match;

verify, in response to the first cloaked token matching the reference pattern, an authenticity of the video; and thereby grant the first person access to the secured resource for which the first user is authorized.

13. The system of claim 12, wherein the instructions further cause the processor to receive second image data at a second time earlier than the first time, wherein the second image data includes image content of a region of bare skin of the first user, and the reference pattern is based on the second image data.

14. The system of claim 13, wherein the instructions further cause the processor to:

employ, prior to the first time, a verification process to verify that the first user is associated with a first user identity;

generate a record that links the second image data to the first user identity; and store the record in a database of the authentication system.

15. The system of claim 12, wherein the first cloaked token is a tattoo that has been applied to the region using one of a glow-in-the-dark, ultraviolet, infrared, photo-chromatic, hydro-chromatic, and thermo-chromatic ink.

16. The system of claim 12, wherein the instructions further cause the processor to:

transmit, from the authentication system and to the first computing device, a control signal in response to the request from the first person; and cause, via the control signal, the camera to capture an image in either the UV or IR spectrum.

17. The system of claim 16, wherein the request from the first person to access the secured resource of the first user is received at the authentication system during a videoconferencing session between the first person and a service representative associated with the secured resource of the first user; and wherein the control signal transmitted by the authentication system to the first computing device is triggered automatically by the authentication system and/or upon initiation by the service representative during the videoconferencing session.

18. The system of claim 12, wherein the first image data is obtained during a videoconferencing session between the first user and a service representative associated with the secured resource.

* * * * *